(12) United States Patent
Yamanaka et al.

(10) Patent No.: US 8,542,449 B2
(45) Date of Patent: Sep. 24, 2013

(54) ENHANCED VARIABLE POWER ZOOM LENS

(75) Inventors: Hisayuki Yamanaka, Saitama (JP); Makoto Kanai, Tokyo (JP); Masafumi Sueyoshi, Tokyo (JP); Masaharu Hosoi, Tokyo (JP)

(73) Assignees: Tamron Co., Ltd, Saitama-shi (JP); Sony Corporation, Tokyo (JP)

( * ) Notice: Subject to any disclaimer, the term of this patent is extended or adjusted under 35 U.S.C. 154(b) by 113 days.

(21) Appl. No.: 13/112,157

(22) Filed: May 20, 2011

(65) Prior Publication Data

US 2011/0286107 A1 Nov. 24, 2011

(30) Foreign Application Priority Data

May 24, 2010 (JP) .................. 2010-118714

(51) Int. Cl.
*G02B 9/60* (2006.01)

(52) U.S. Cl.
USPC ........................................... 359/764

(58) Field of Classification Search
USPC .................. 359/684, 699, 763, 764
See application file for complete search history.

(56) References Cited

U.S. PATENT DOCUMENTS

| | | | |
|---|---|---|---|
| 5,956,184 A | 9/1999 | Sato | |
| 6,236,516 B1 | 5/2001 | Misaka | |
| 7,187,504 B2 | 3/2007 | Horiuchi | |
| 7,450,314 B2 | 11/2008 | Satori et al. | |
| 7,532,412 B2 | 5/2009 | Hatada | |
| 7,755,844 B2 | 7/2010 | Take | |
| 7,848,028 B2 | 12/2010 | Ohtake | |
| 7,974,012 B2 | 7/2011 | Yamaguchi | |
| 2009/0147374 A1 | 6/2009 | Mogi | |
| 2009/0251781 A1 | 10/2009 | Adachi et al. | |
| 2009/0251795 A1 | 10/2009 | Adachi et al. | |
| 2009/0290232 A1* | 11/2009 | Hagiwara | ............... 359/695 |
| 2010/0033838 A1 | 2/2010 | Saori | |
| 2011/0261250 A1 | 10/2011 | Touchi et al. | |

FOREIGN PATENT DOCUMENTS

| | | |
|---|---|---|
| CN | 1700049 A | 11/2005 |
| CN | 1877387 A | 12/2006 |
| CN | 101256271 A | 9/2008 |
| CN | 101369049 A | 2/2009 |
| CN | 101403817 A | 4/2009 |
| CN | 101470255 A | 7/2009 |
| CN | 101644827 A | 2/2010 |
| JP | 05-232410 | 9/1993 |
| JP | 10-133109 | 5/1998 |

(Continued)

*Primary Examiner* — Joseph P Martinez
(74) *Attorney, Agent, or Firm* — Westerman, Hattori, Daniels & Adrian, LLP

(57) ABSTRACT

An enhanced variable power zoom lens is lightweight in whole and in part, especially, having its focusing lens optics reduced in weight so as to relieve of a load on a focusing drive system, and having its anti-vibration lens optics reduced in both diameter and weight so as to relieve of a load on an anti-vibration drive system and downsize the same. The zoom lens has the foremost or first lens group of positive refractivity, the second lens group of negative refractivity, the third lens group of positive refractivity, the fourth lens group of negative refractivity, and the fifth lens group arranged in sequence from a position closer to the object. The fourth lens group moves toward the image plane for focusing on from the infinity to a proximity object while part of the third lens group moves orthogonal to the optical axis for shifting an image.

4 Claims, 28 Drawing Sheets

(56) References Cited

FOREIGN PATENT DOCUMENTS

| | | |
|---|---|---|
| JP | 2000-028923 | 1/2000 |
| JP | 2003-329933 | 11/2003 |
| JP | 2005-331697 | 12/2005 |
| JP | 2009-265652 | 11/2009 |

* cited by examiner

FIG.2A
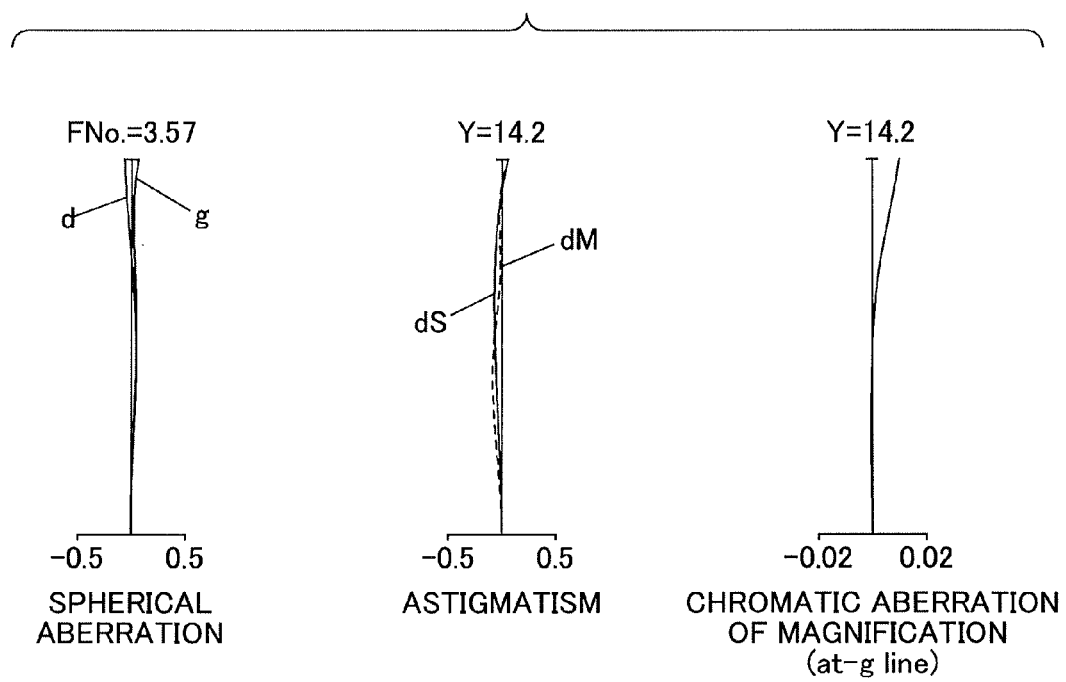
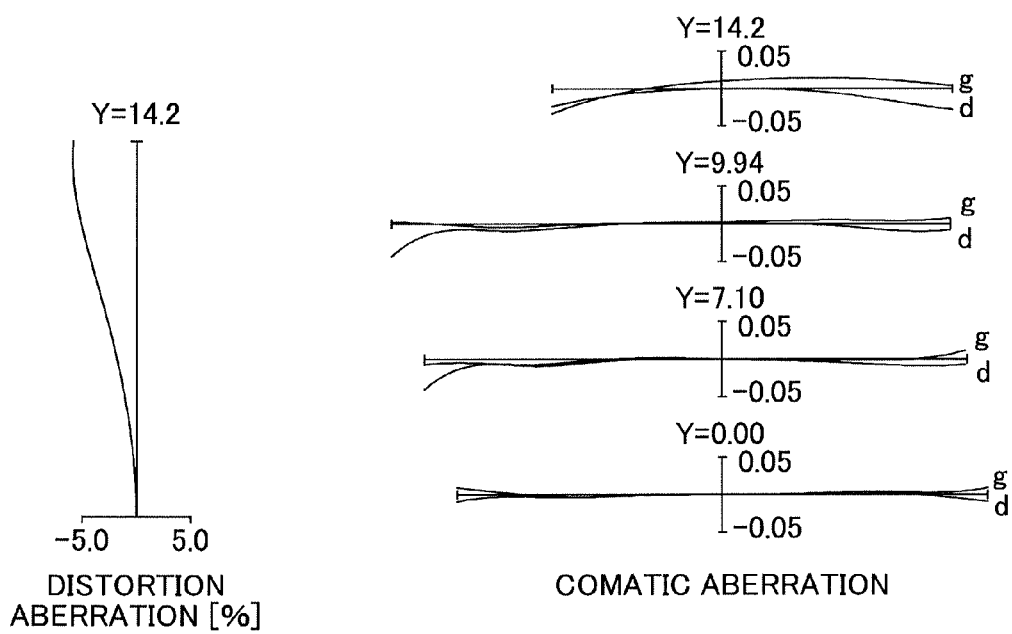

FIG.3A
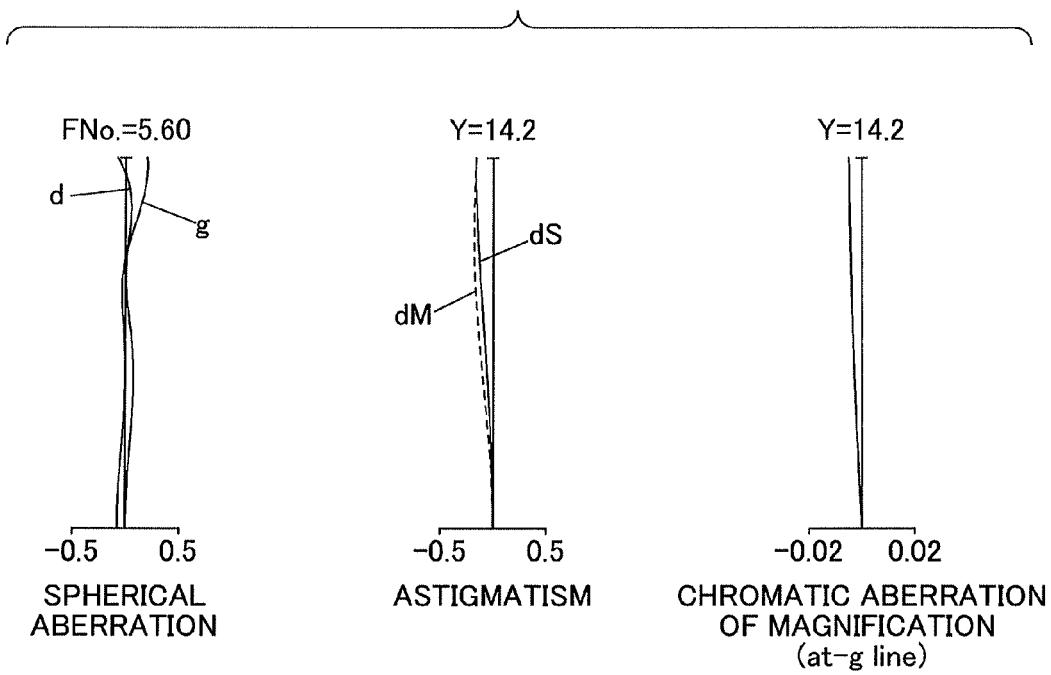
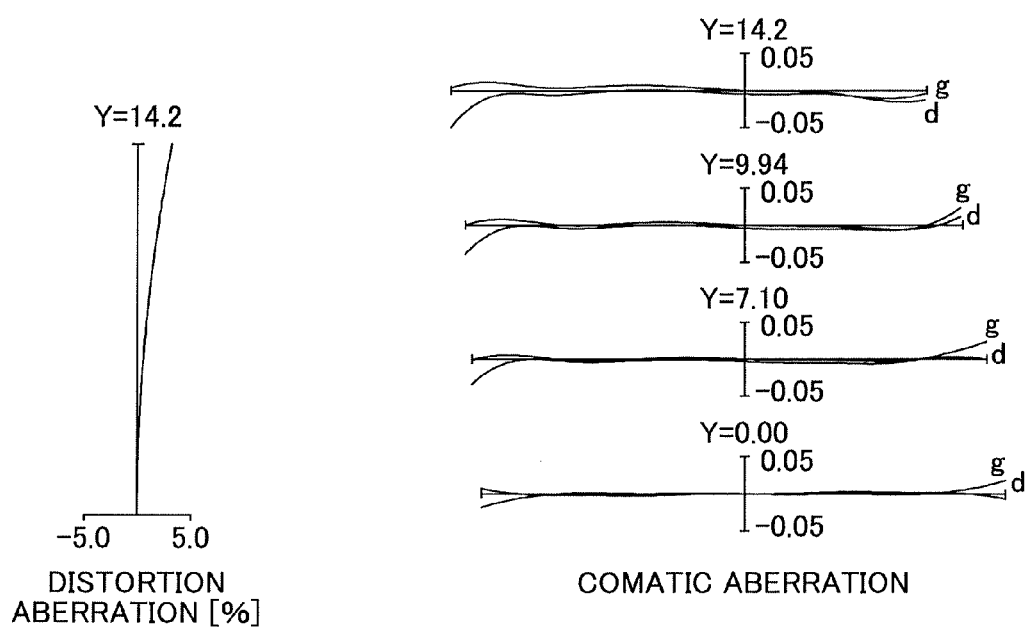

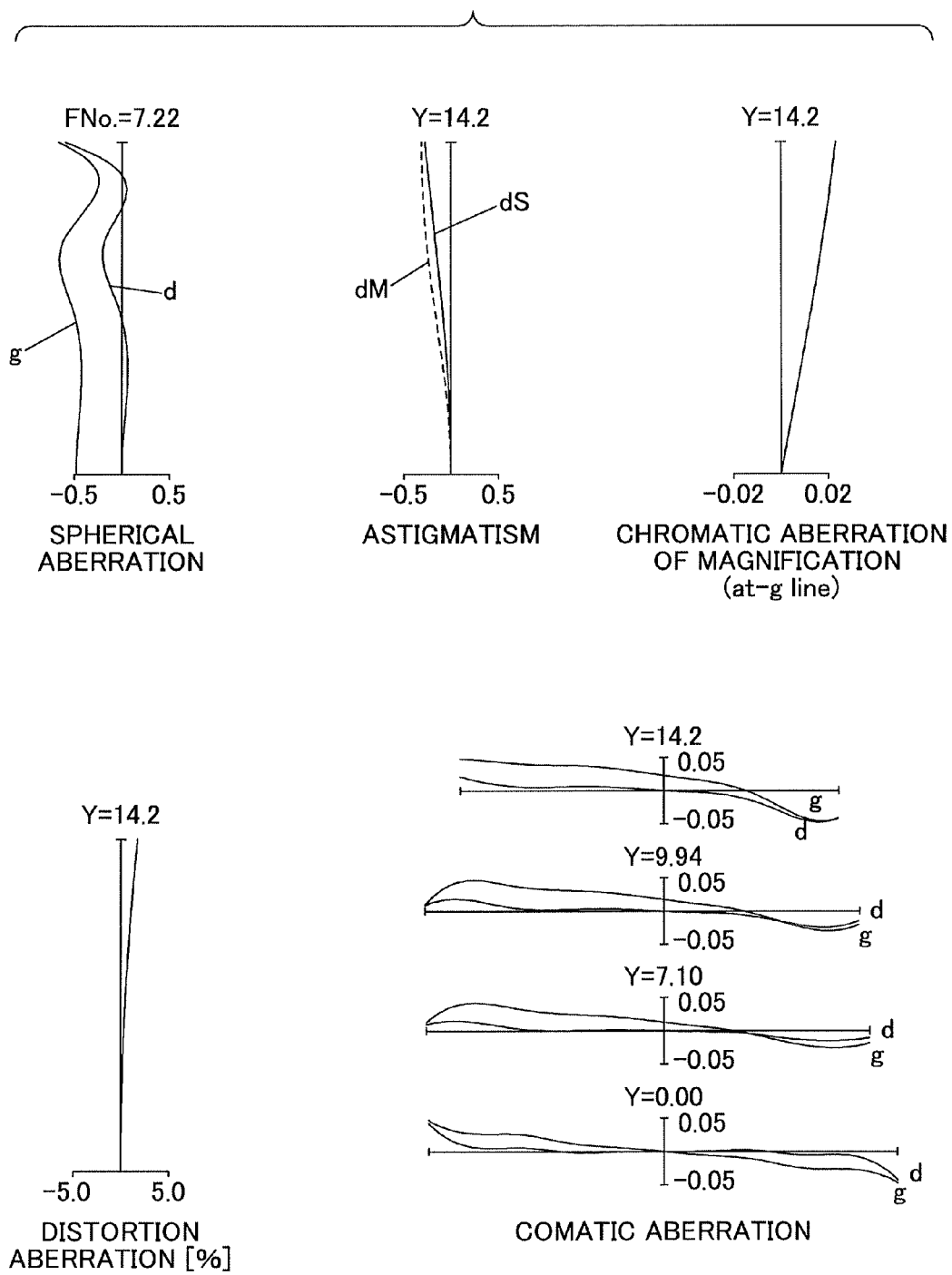

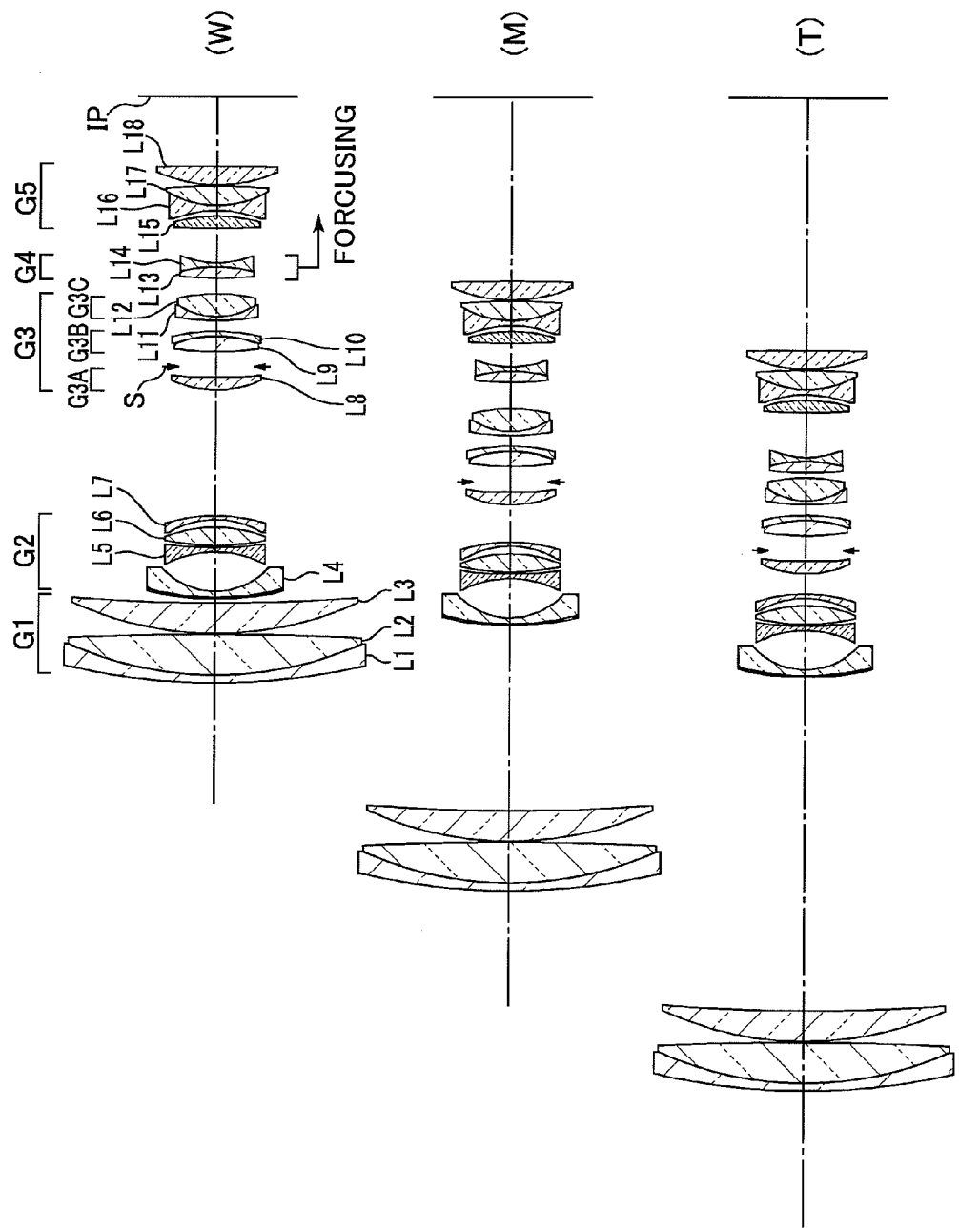

FIG.6A
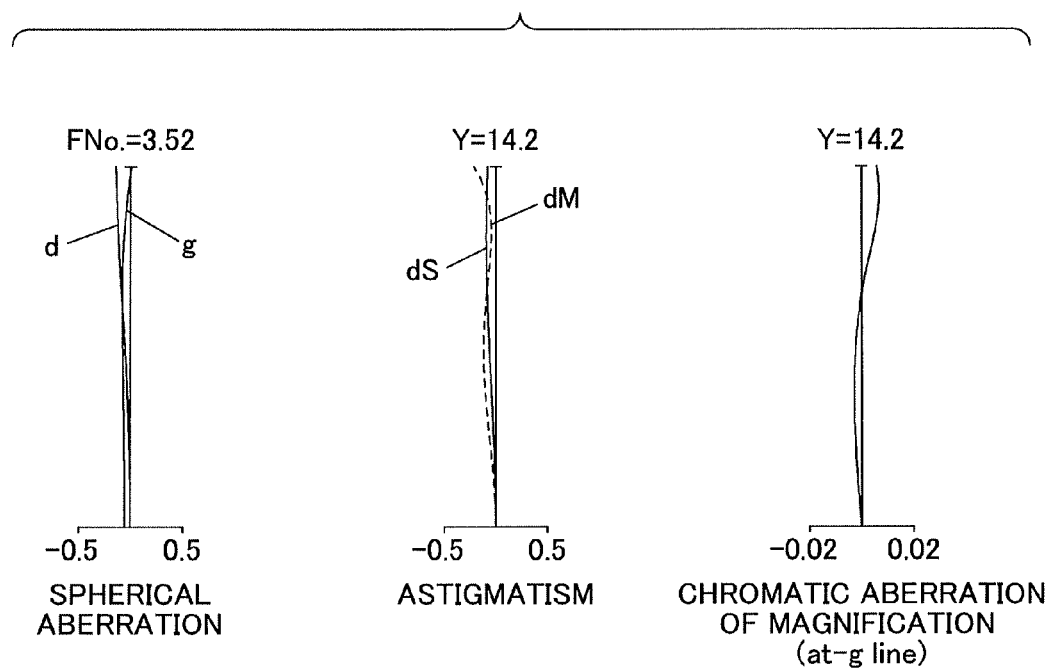
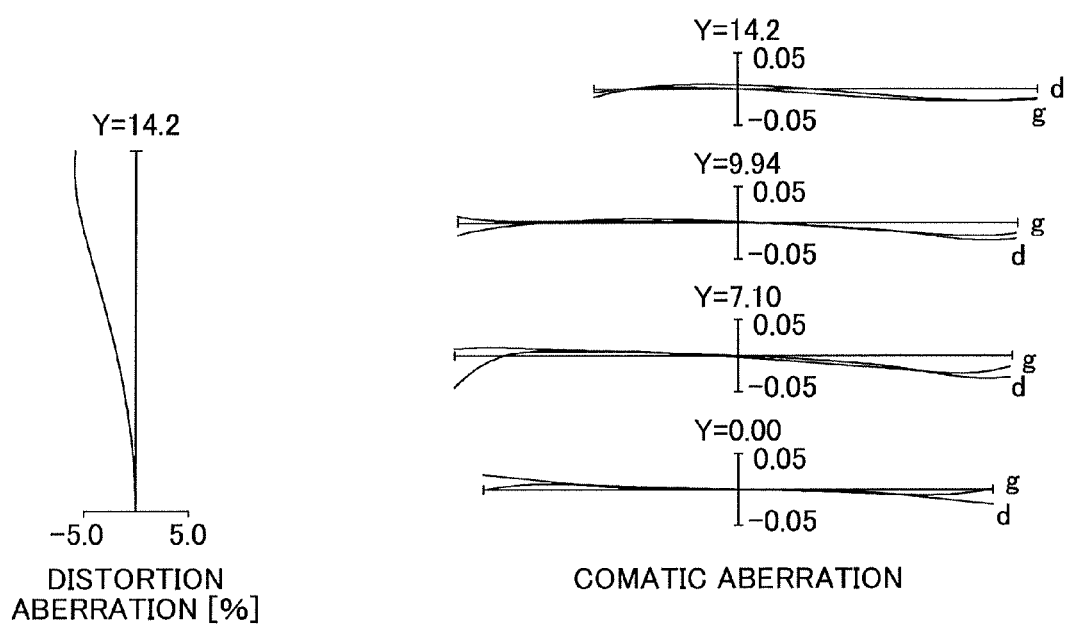

FIG.6B
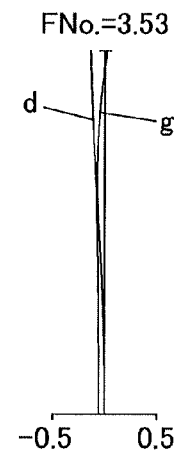
SPHERICAL ABERRATION
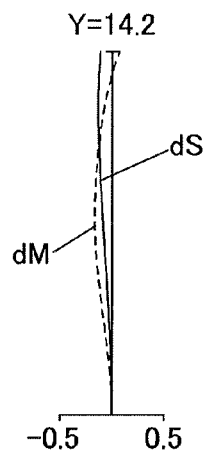
ASTIGMATISM
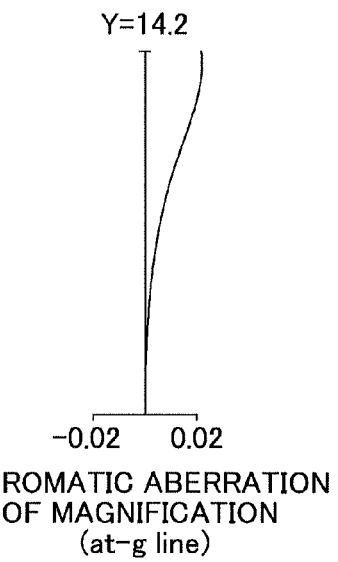
CHROMATIC ABERRATION OF MAGNIFICATION (at-g line)
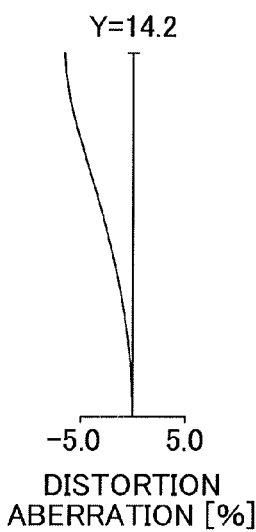
DISTORTION ABERRATION [%]
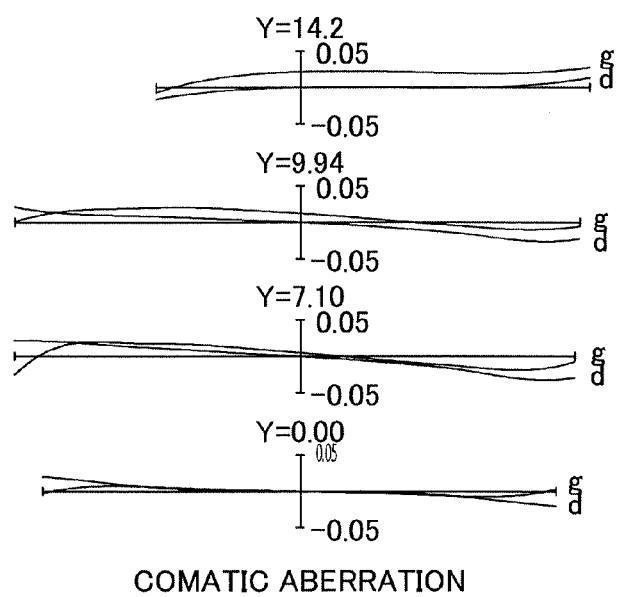
COMATIC ABERRATION

FIG.7A
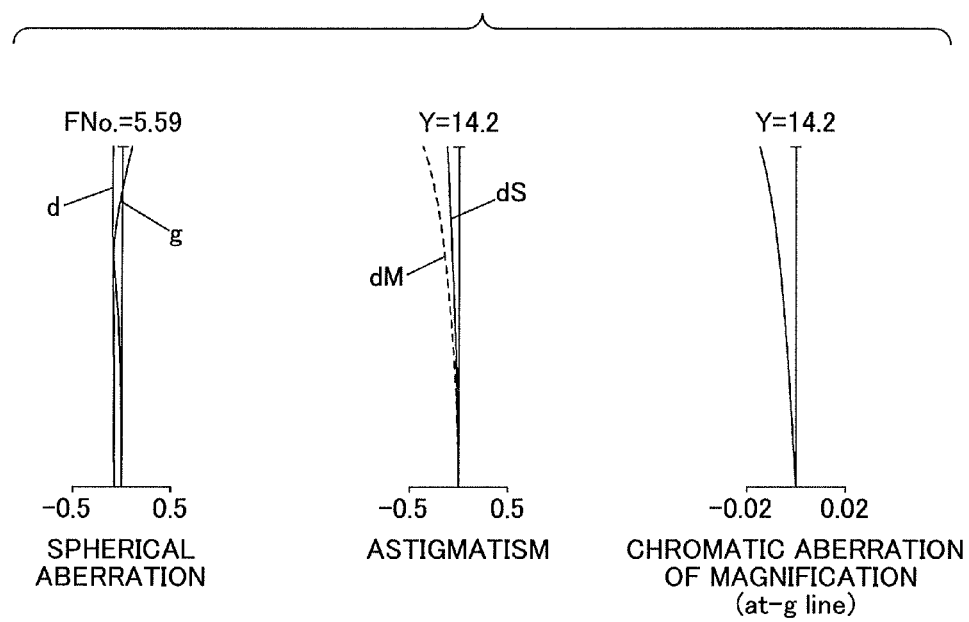
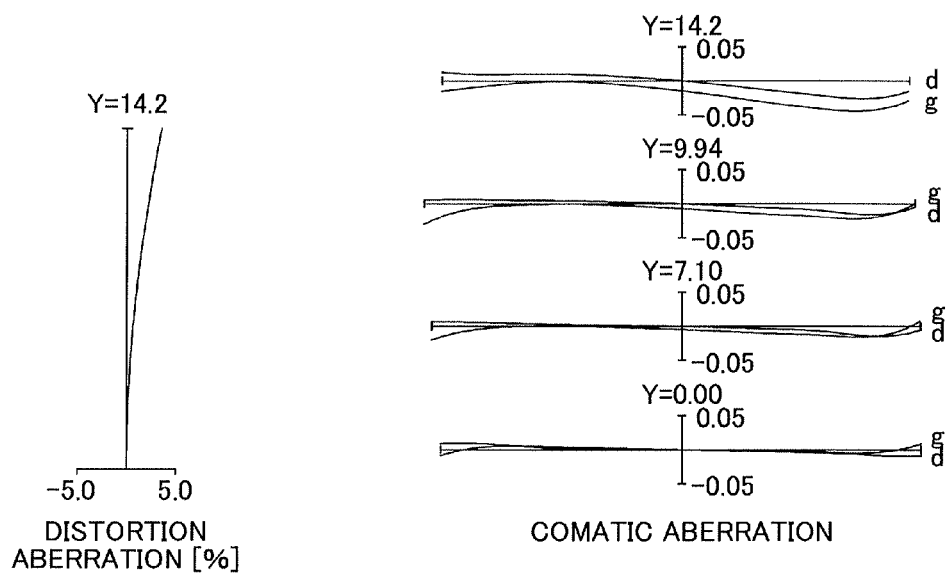

FIG.7B
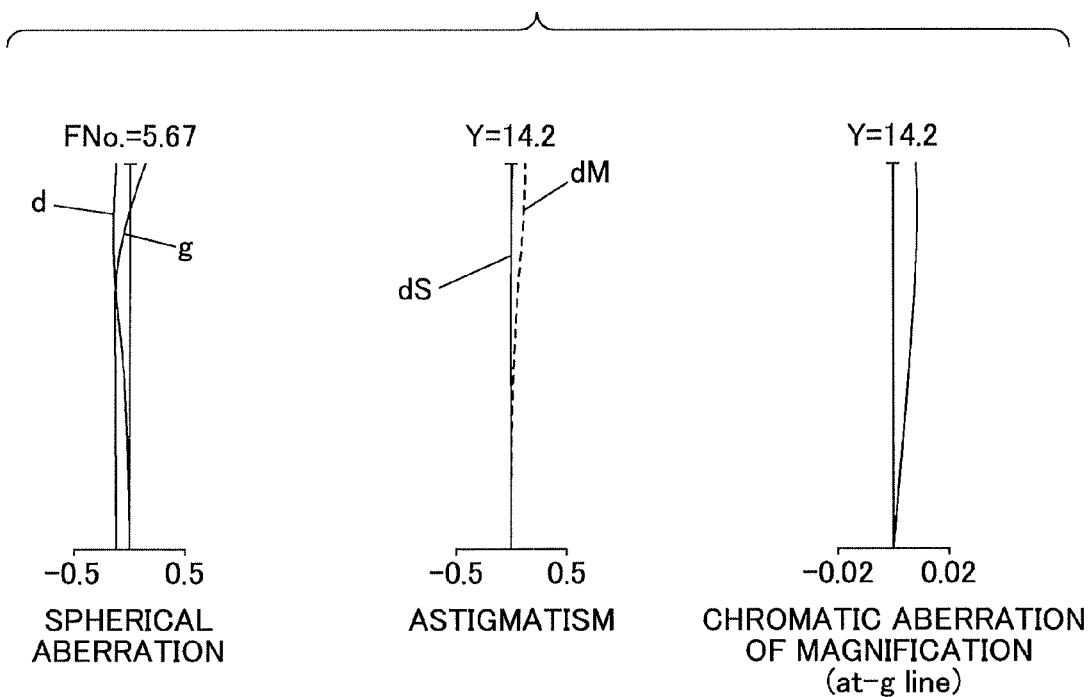
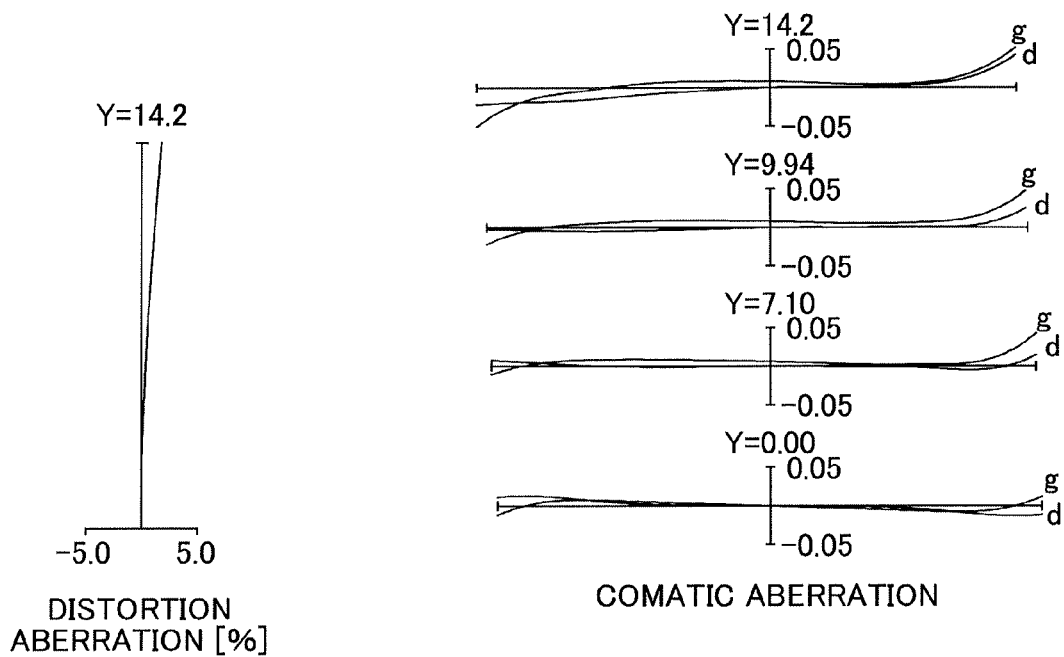

FIG.8A
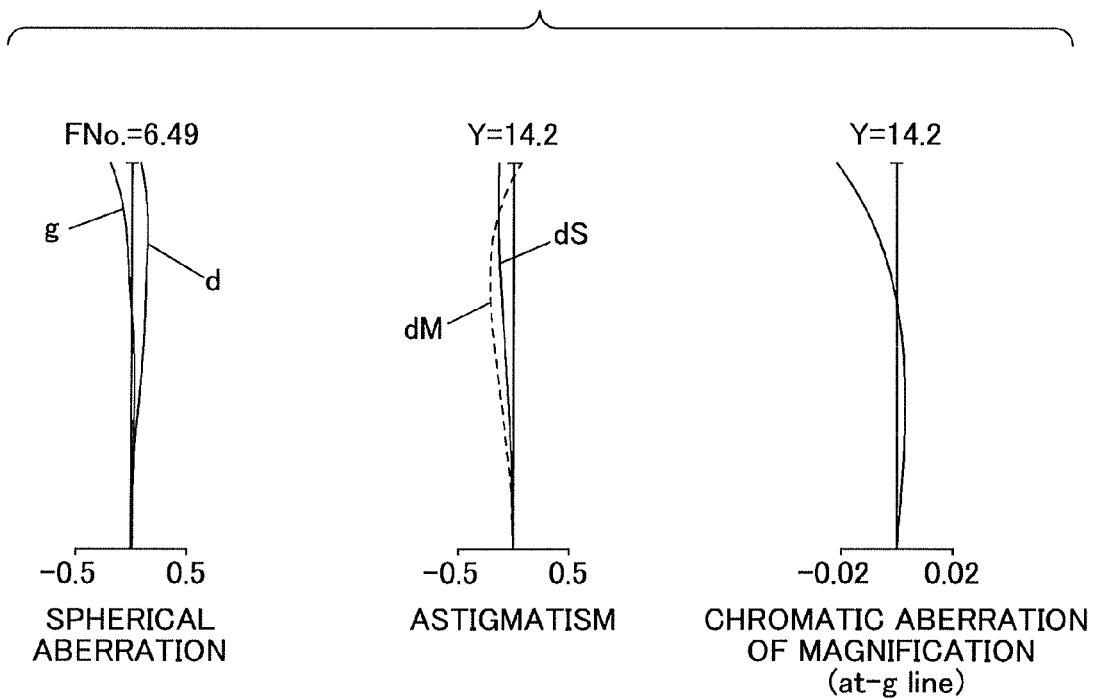
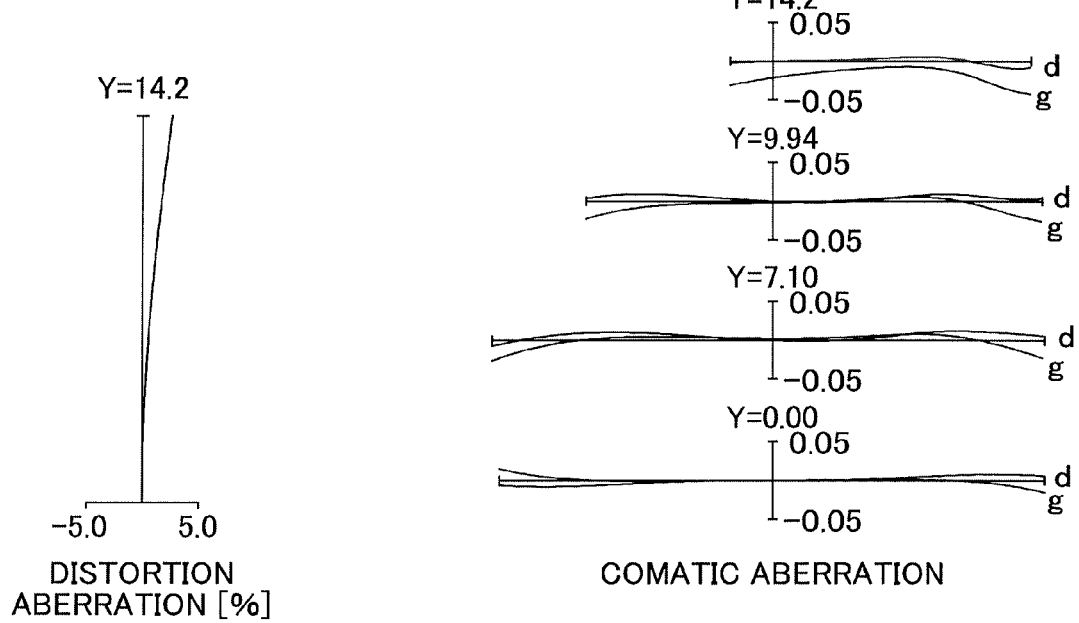

FIG.8B
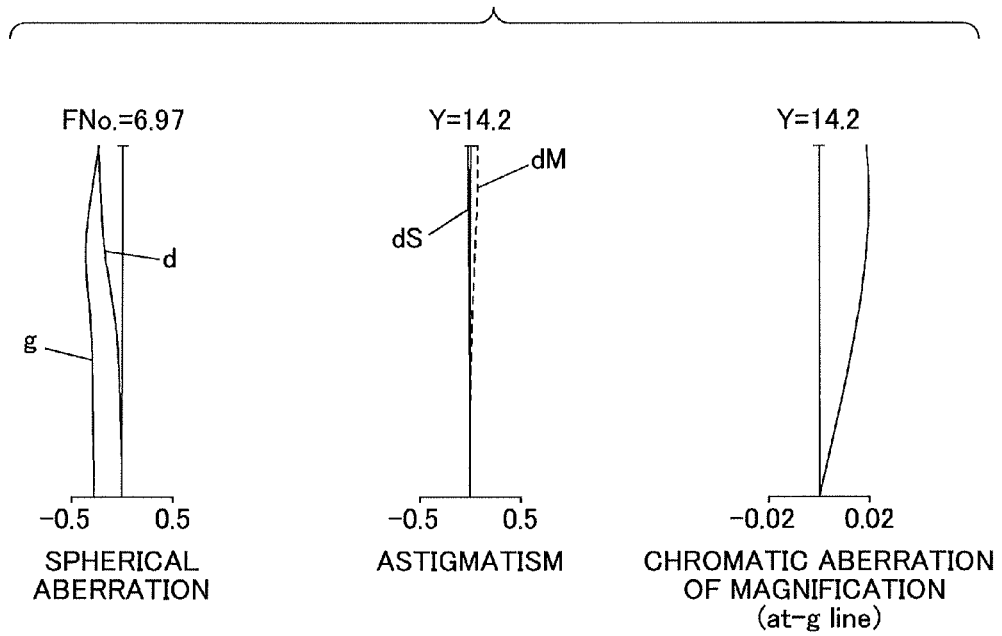
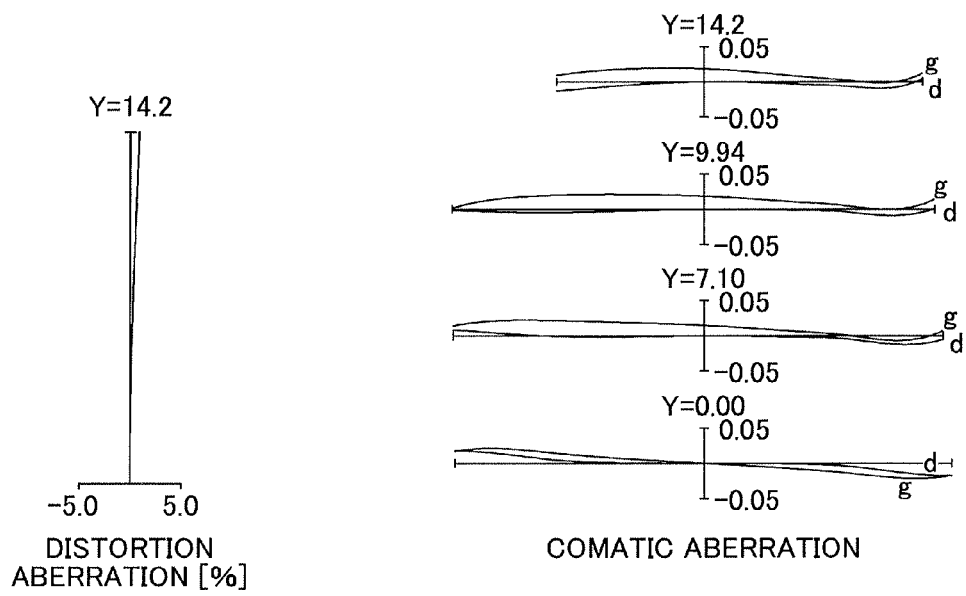

FIG.10A
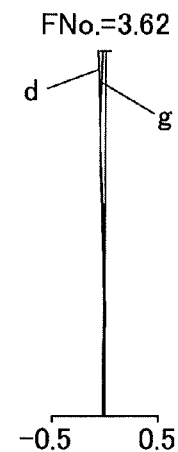
SPHERICAL ABERRATION
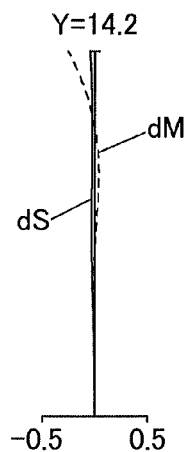
ASTIGMATISM
CHROMATIC ABERRATION OF MAGNIFICATION
(at-g line)
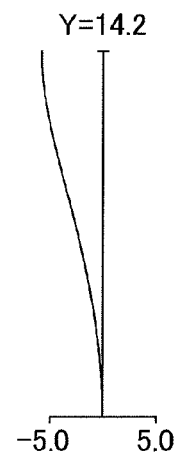
DISTORTION ABERRATION [%]
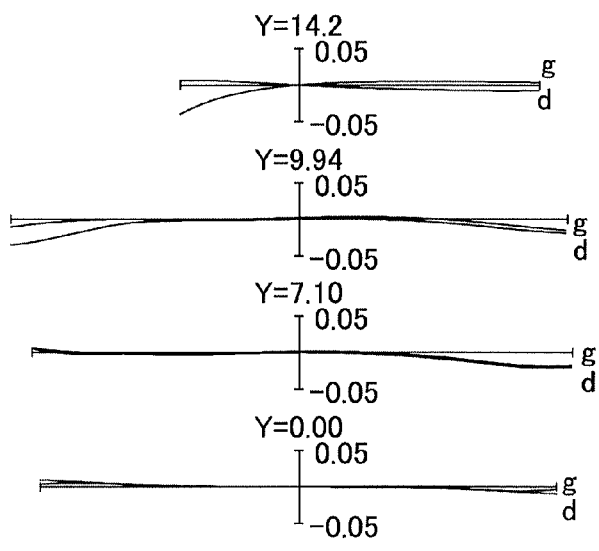
COMATIC ABERRATION

FIG.10B
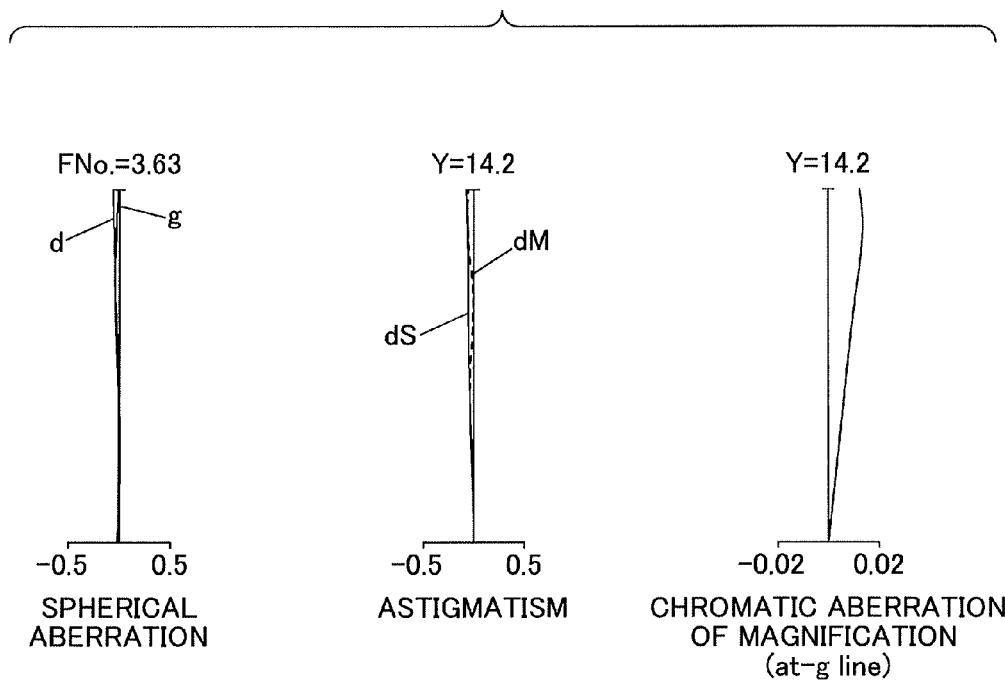
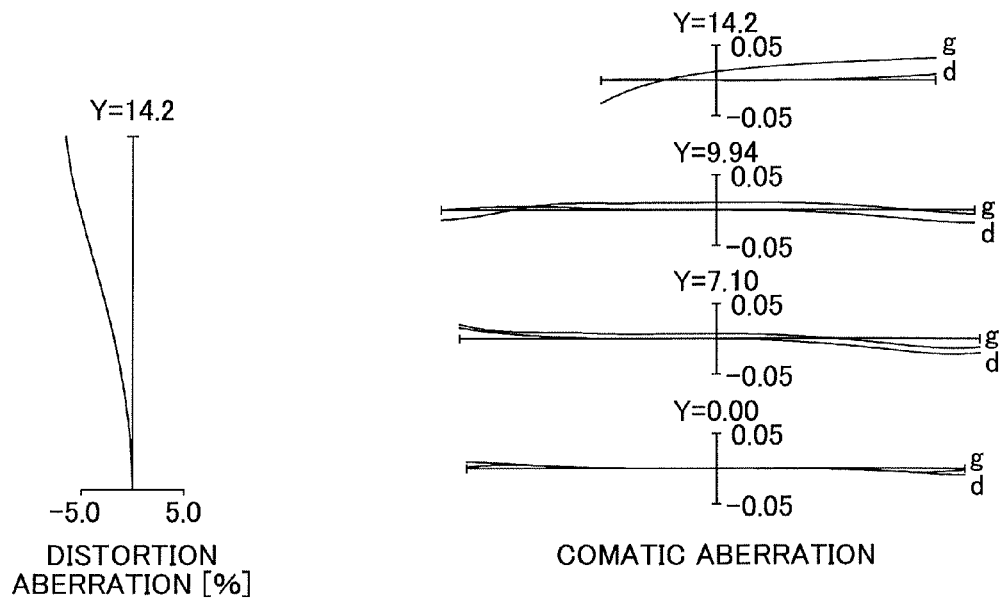

FIG.11A
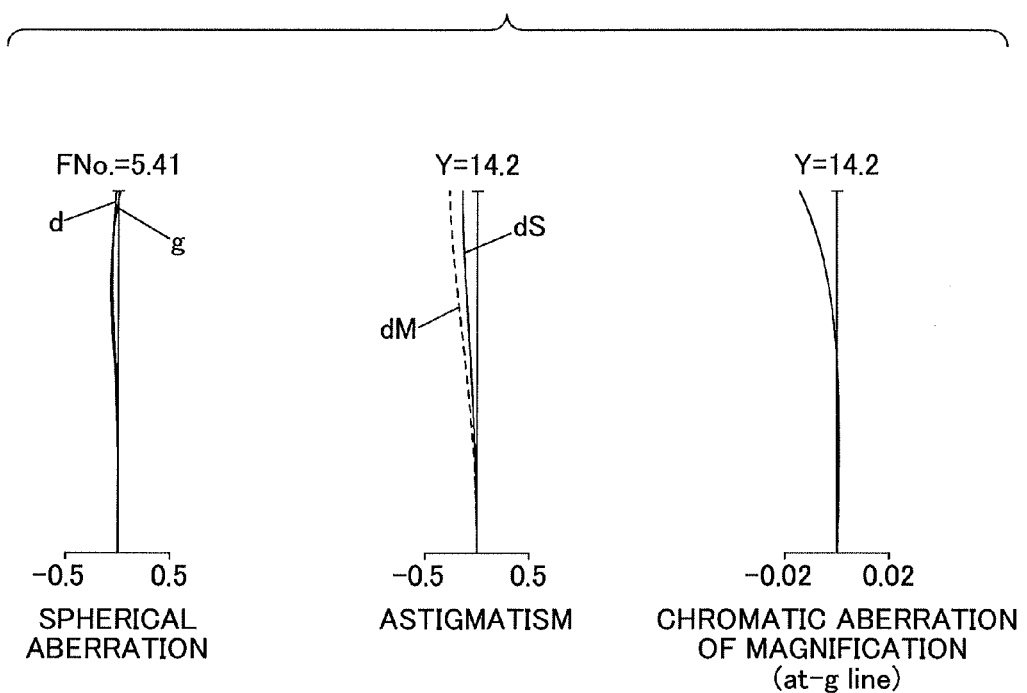
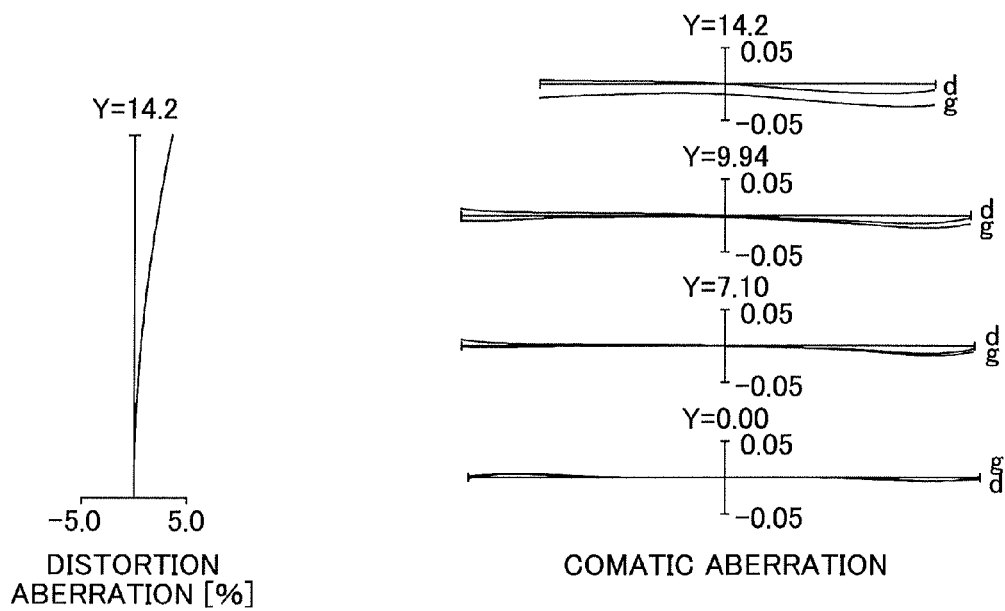

FIG.11B
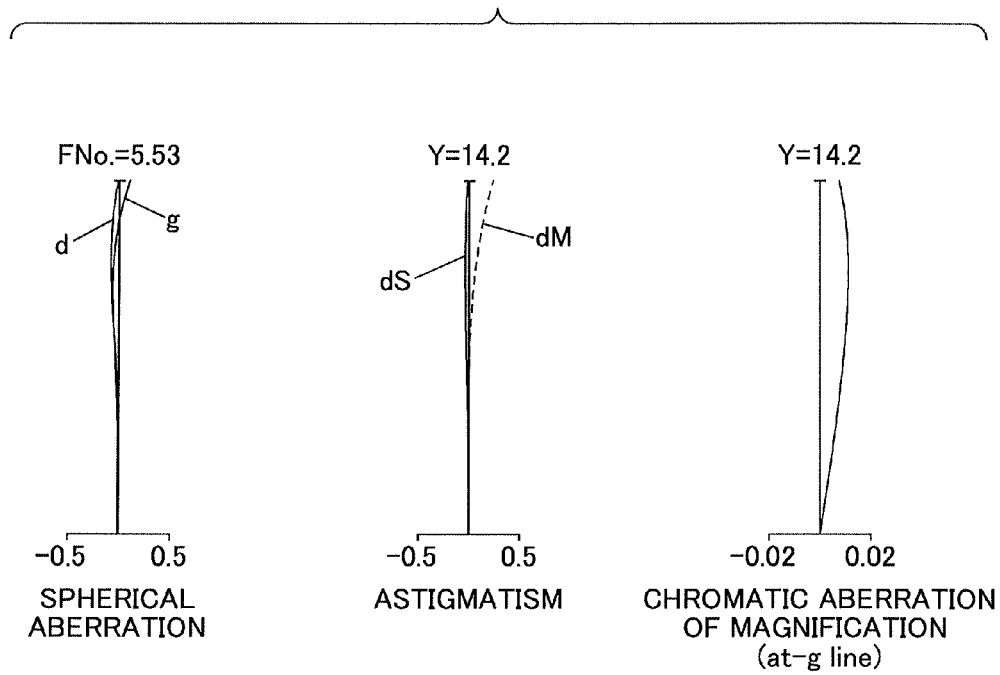
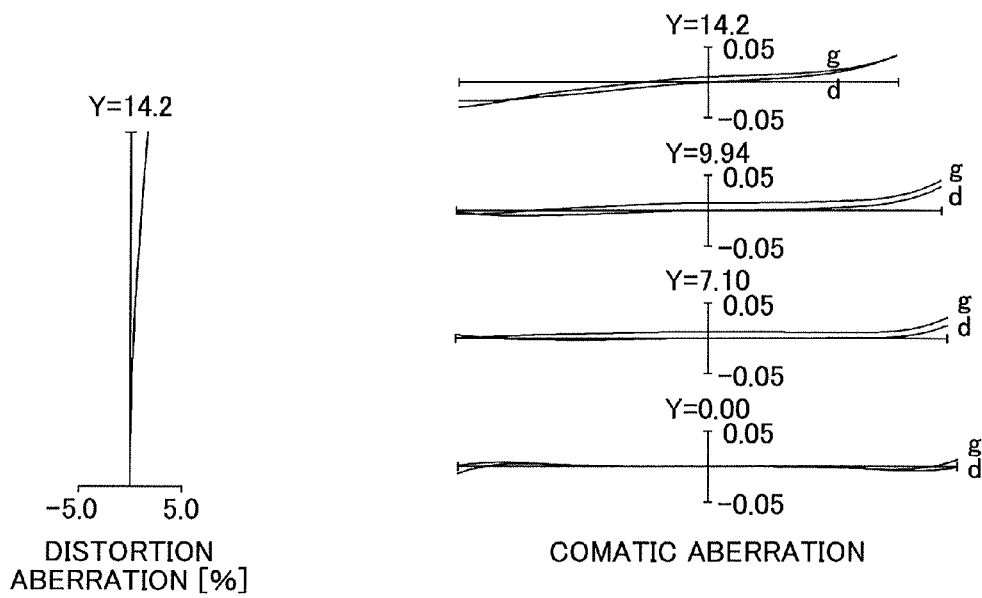

FIG.12A
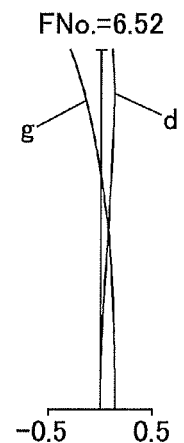
SPHERICAL ABERRATION
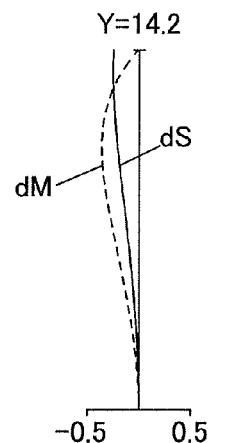
ASTIGMATISM
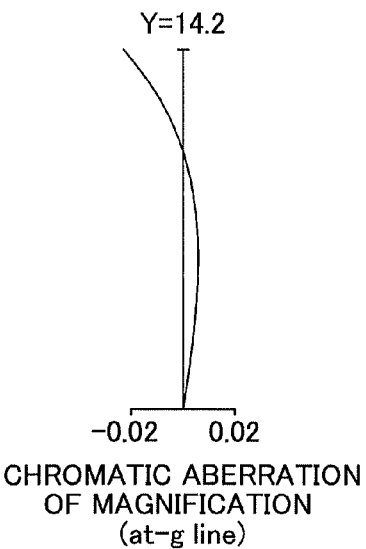
CHROMATIC ABERRATION OF MAGNIFICATION (at-g line)
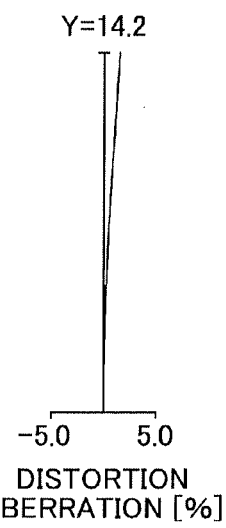
DISTORTION ABERRATION [%]
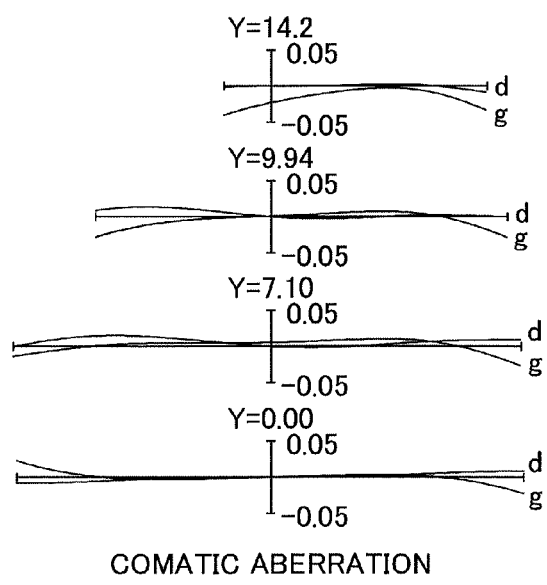
COMATIC ABERRATION FIG.12B
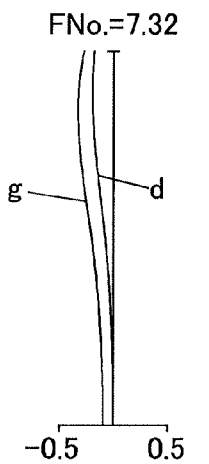
SPHERICAL ABERRATION
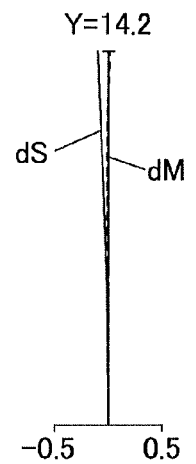
ASTIGMATISM
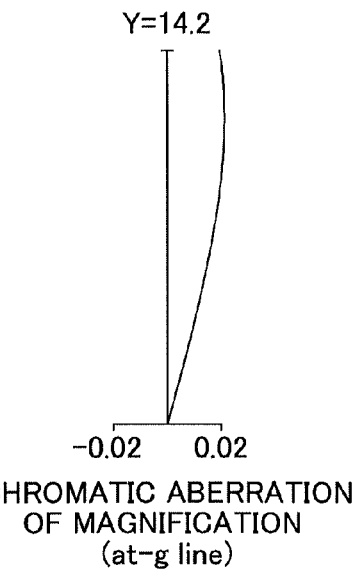
CHROMATIC ABERRATION OF MAGNIFICATION (at-g line)
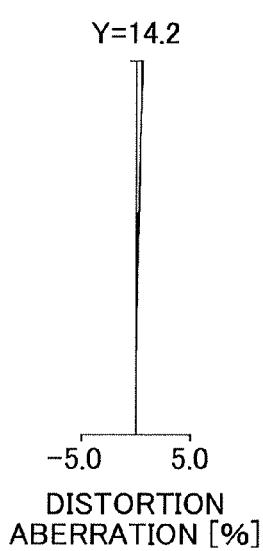
DISTORTION ABERRATION [%]
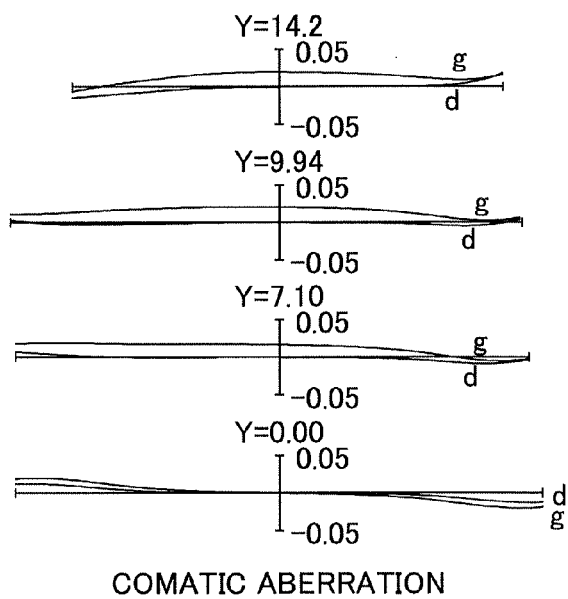
COMATIC ABERRATION

FIG.14A
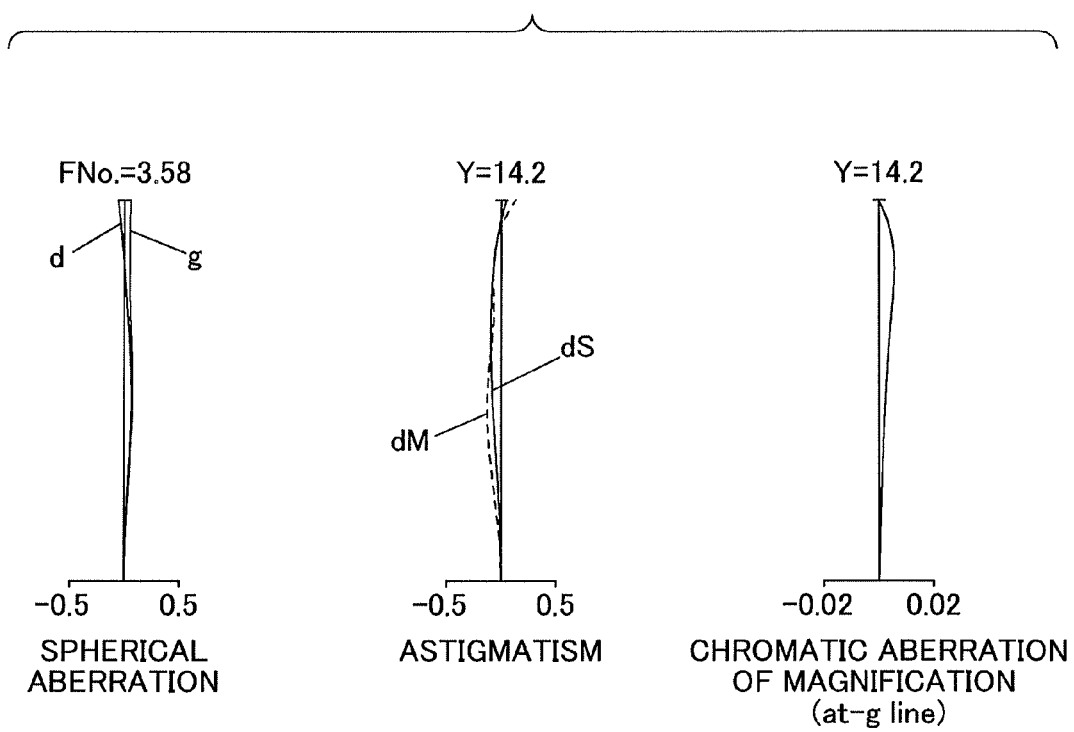
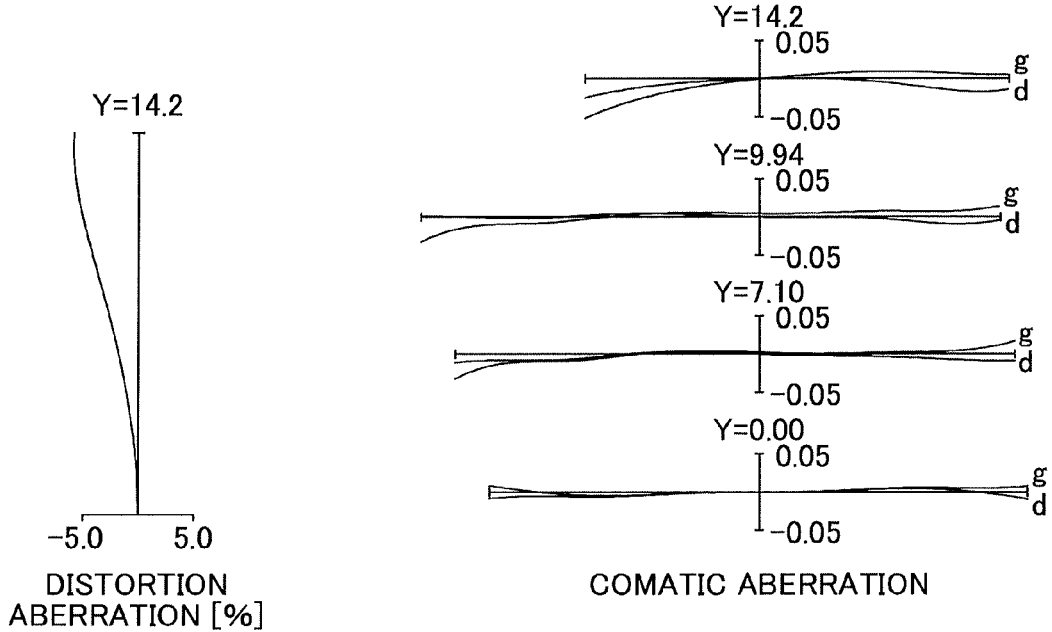

FIG.14B
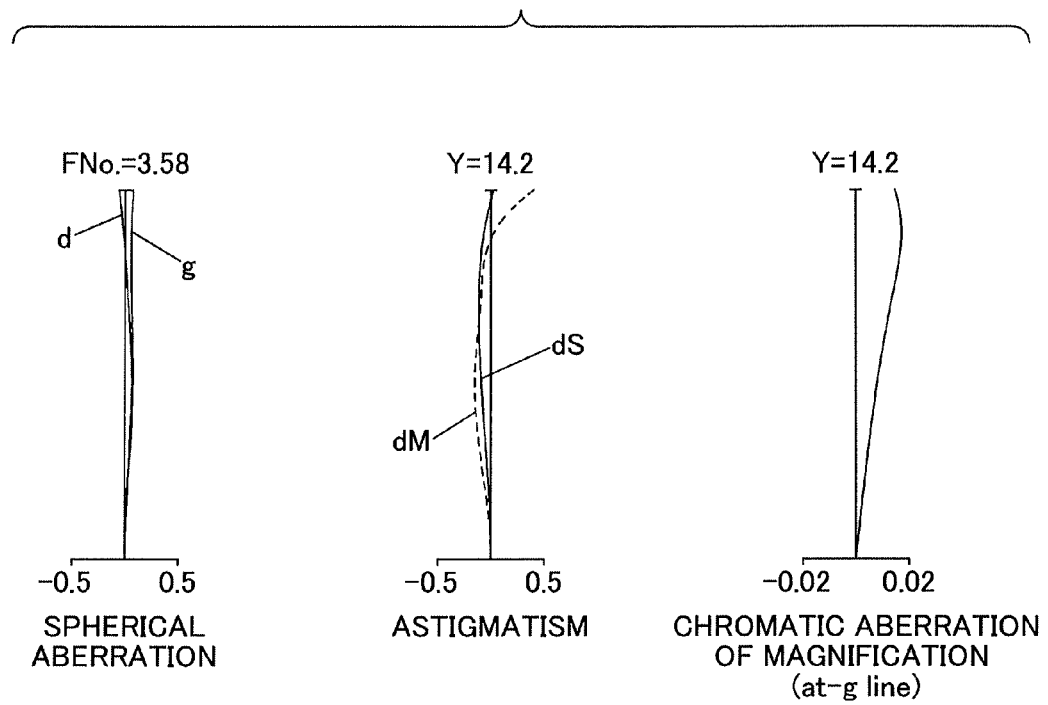
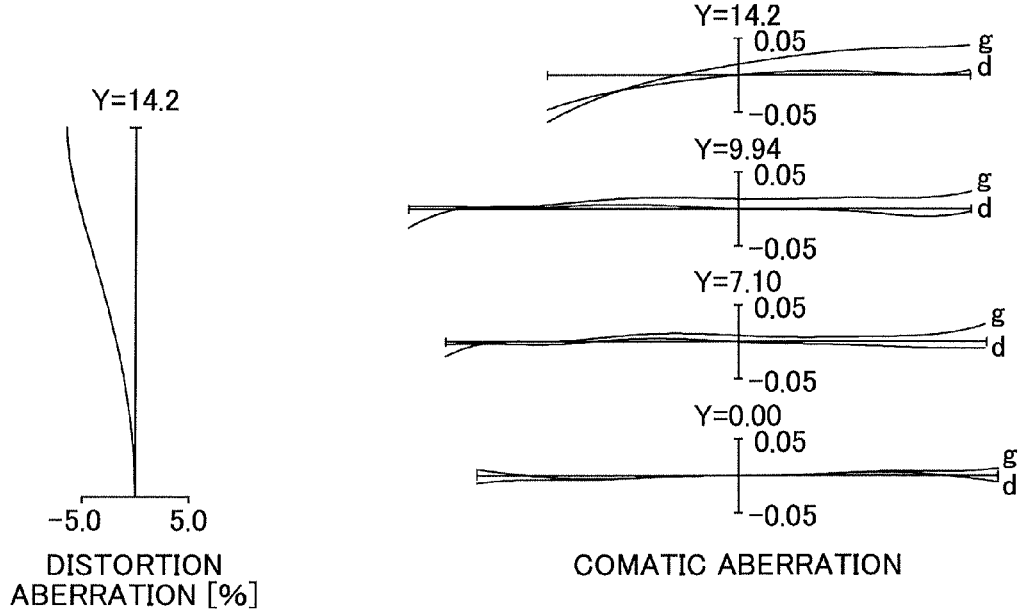

FIG.15A
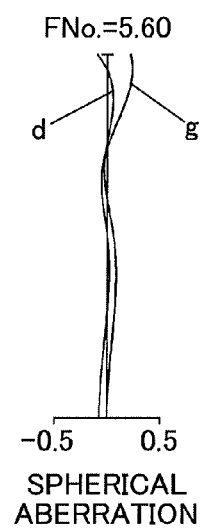
SPHERICAL ABERRATION
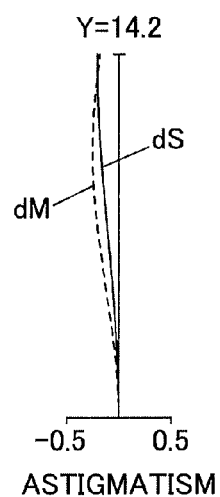
ASTIGMATISM
CHROMATIC ABERRATION OF MAGNIFICATION (at-g line)
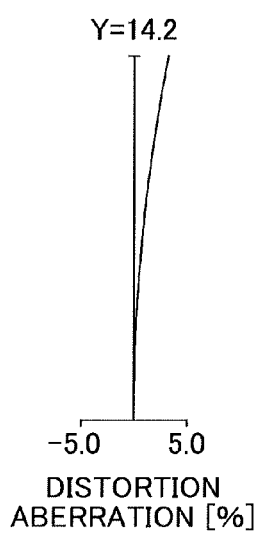
DISTORTION ABERRATION [%]
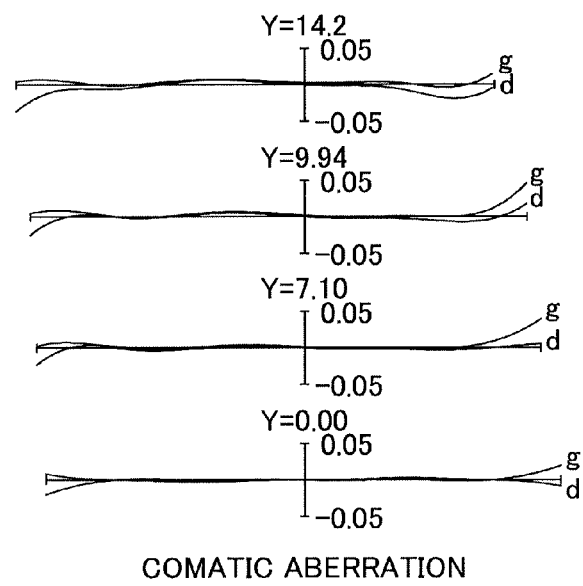
COMATIC ABERRATION FIG.15B
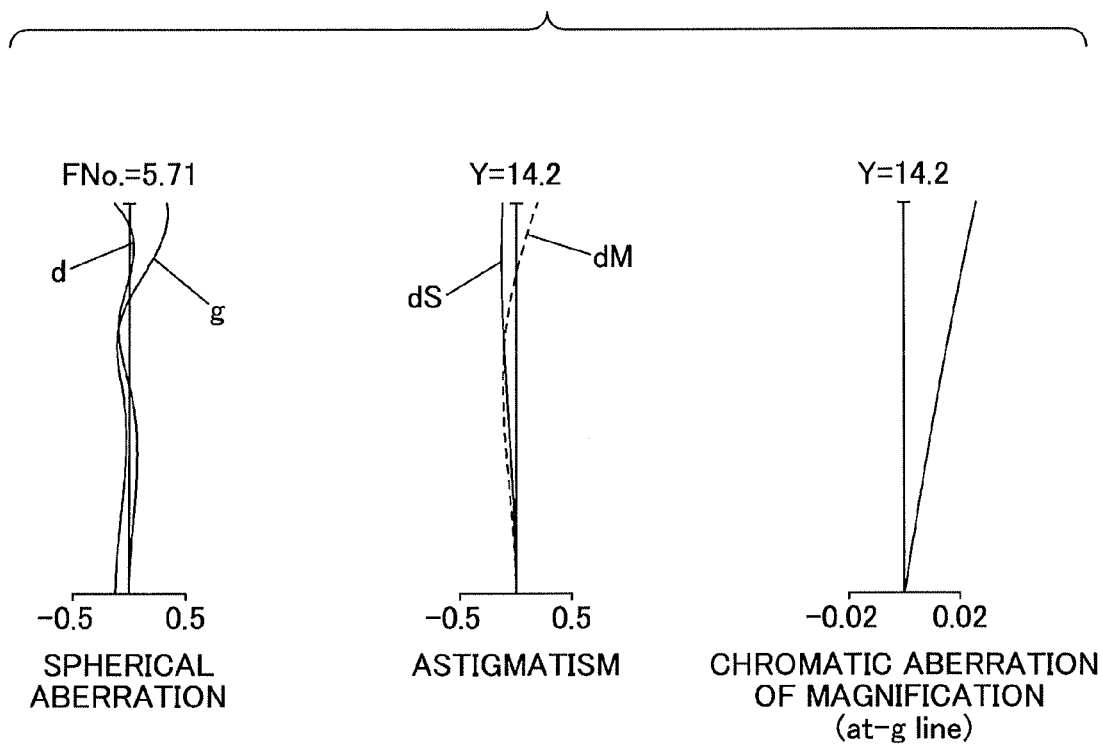
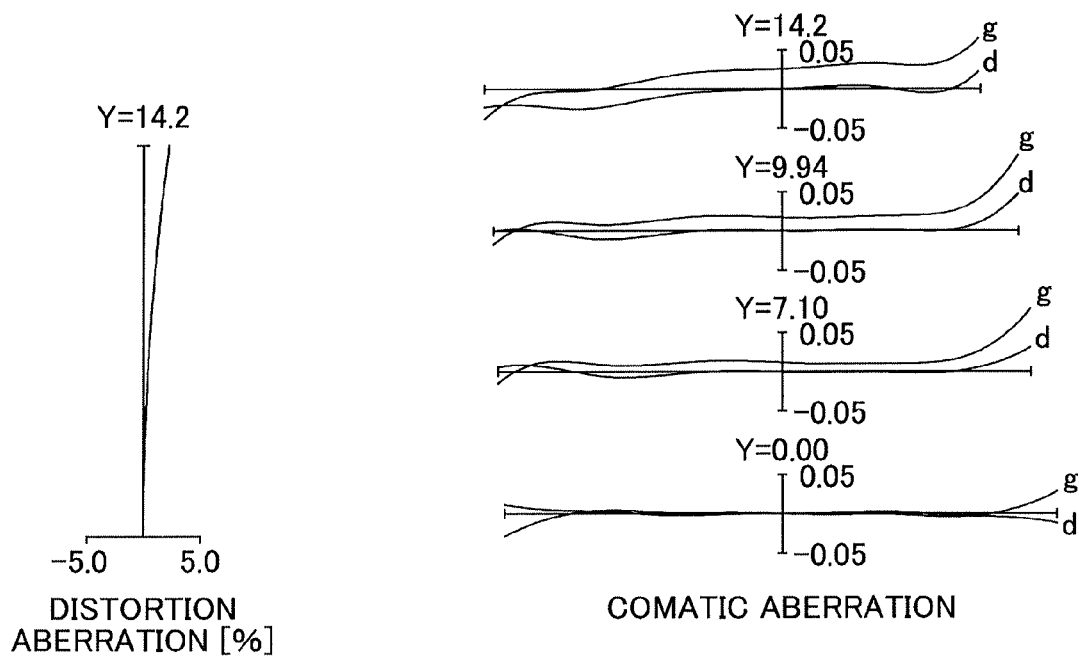

FIG.16A
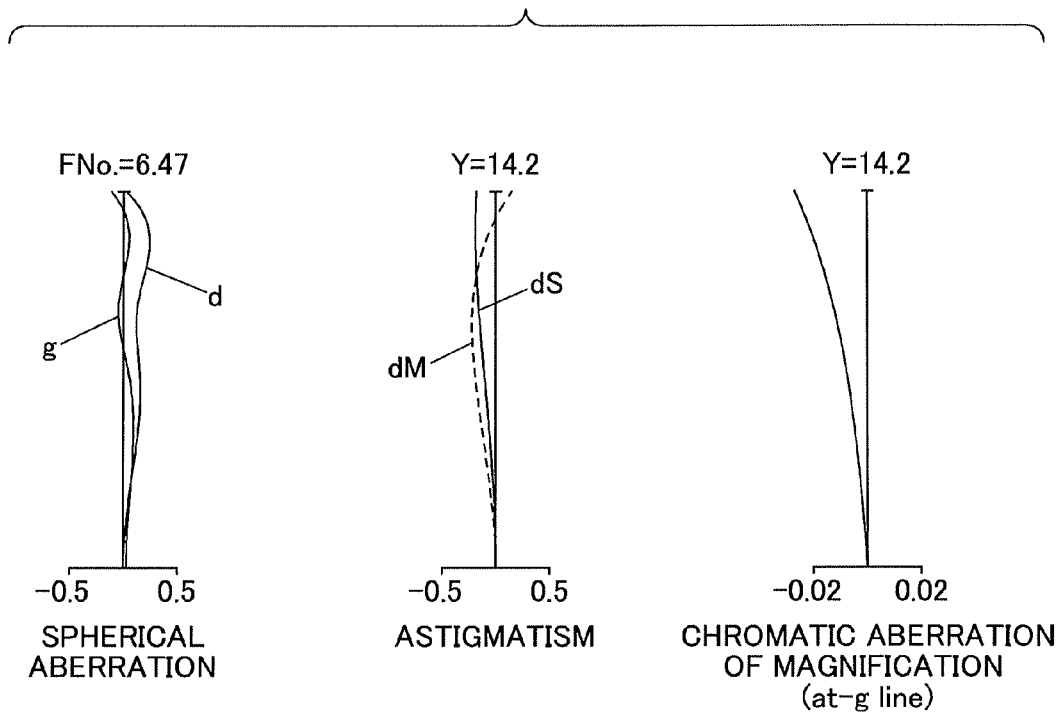
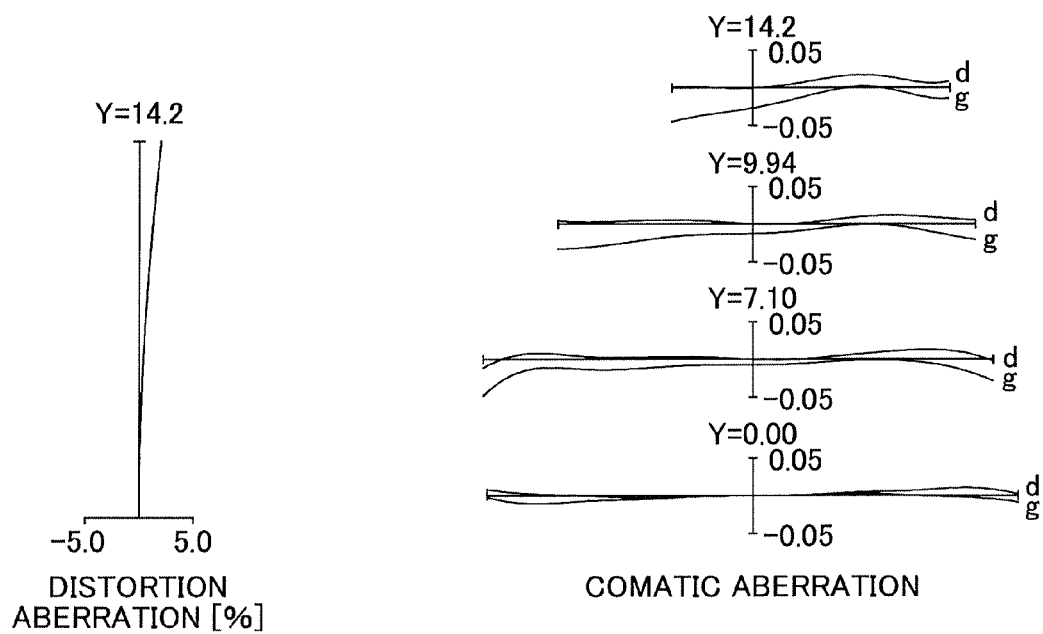

FIG.16B
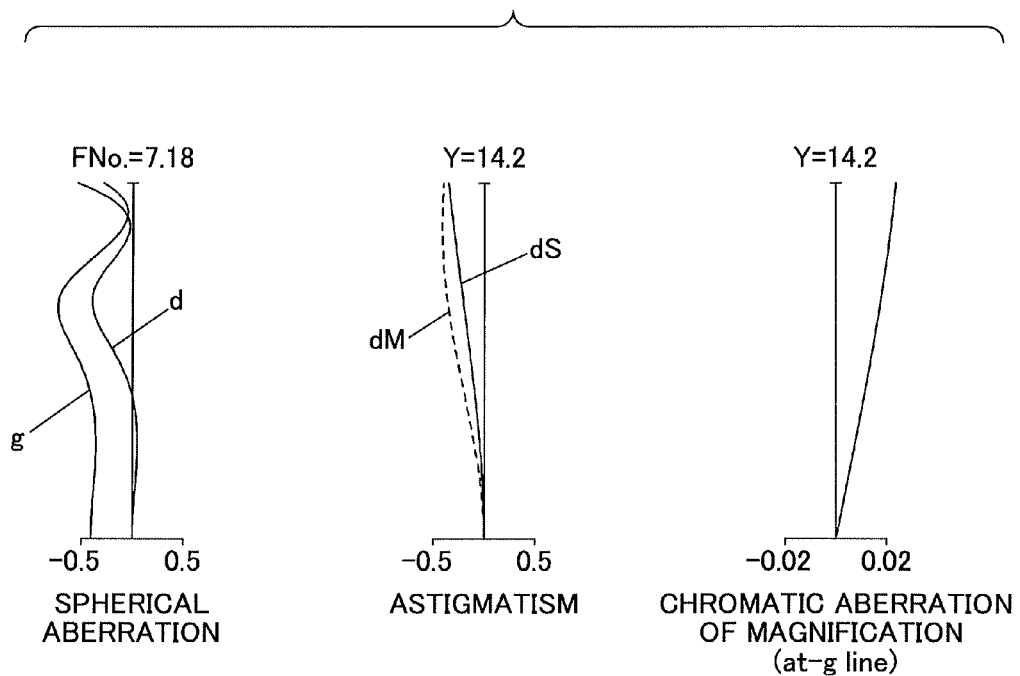
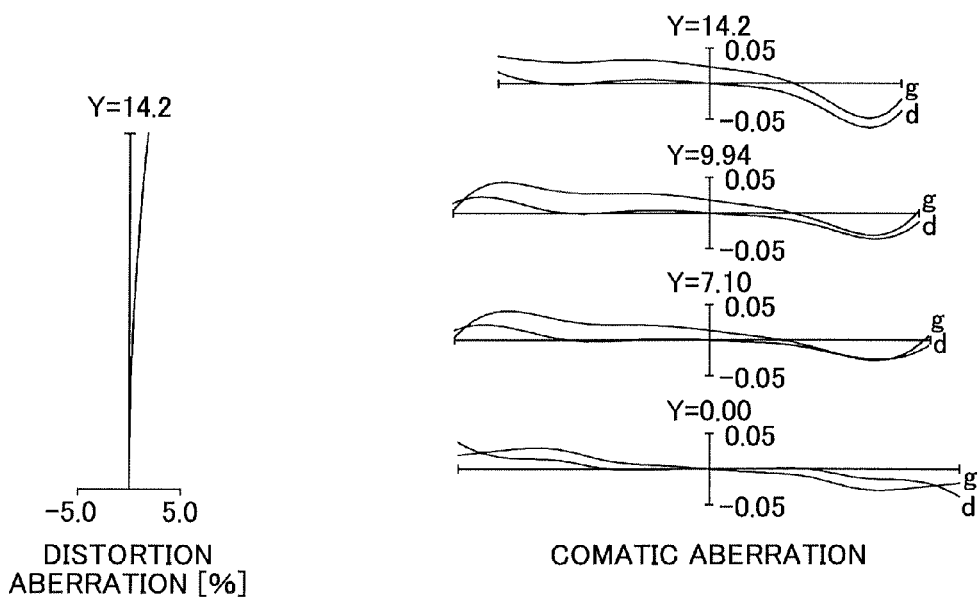

ENHANCED VARIABLE POWER ZOOM LENS

FIELD OF THE INVENTION

The present invention relates to a compact and enhanced variable power zoom lens having a zoom ratio of 10× or even greater and an angle of view of 75 degrees or even wider at the wide-angle end, which is suitable for use in 35 mm cameras, video cameras, electronic still cameras, and the like.

BACKGROUND ART

As one example of prior art focusing systems for a zoom lens, an upfront lens focusing system is well-known in the art where the foremost group of lens pieces positioned the closest to the object to photograph is displaced for focusing. When designed in an application of an auto-focusing zoom lens, the upfront lens focusing zoom lens must have its large and heavy foremost lens group moved along the optical axis, and this makes it difficult to achieve instantaneous focusing.

In order to overcome the aforementioned disadvantage, inner and rear focusing systems that force the second foremost lens group and/or the further succeeding one(s) are to be displaced instead have come to be known. Employing the inner or rear focusing system brings about a successful result in achieving an instantaneous auto focusing zoom lens of which focusing lens groups can be generally down-sized and reduced in weight so as to reduce the load on an actuating motor for an auto focusing mechanism.

On the other hand, there generally arises a problem with such an enhanced variable power zoom lens that user's hands are liable to shake during photographing at the telephoto end. In order to avoid the adverse effect on the resultant image due to a shake of photographer's hands, a variety of methods have been devised for displacing part of the lens optics in an approximately perpendicular direction to the optical axis so that rays imaged on light receptor are shifted on the same, thereby canceling an image blur due to a shake of hands of the photographer.

It is also strongly desired that the enhanced variable power zoom lens is compact so as not to spoil user's convenience.

Especially, some digital single lens reflex cameras having the state-of-the-art live view feature carry out contrast auto-focusing, namely, bring rays into focus by wobbling. Hence, the greater weight of the focusing lens group(s) should requires the larger actuator to displace the focusing lens group(s), which results in the focusing systems becoming bulky as a whole; and therefore, it is strongly desirable that the focusing lens group(s) is reduced in weight.

Further developed has been a compact, high performance, and enhanced variable power zoom lens which has lens groups respectively of positive, negative, positive, and positive refractive powers arranged in order for zooming; and this prior art enhanced variable power zoom lens, when attached to a lens-exchangeable digital single lens reflex camera with an APS-C size image sensor built in, attains angle of view as wide as 76 degrees that is equivalent to 28 mm in a single lens reflex camera dedicated for 35 mm film, and zoom ratio as high as 7×, and has back focal equivalent to that of a lens-exchangeable single lens reflex camera (e.g., see Patent Document 1 listed below).

Some other prior art enhanced variable power zoom lens developed so far includes a photographing lens that has anti-vibration function and improved performance and that has lens groups respectively of positive, negative, negative, positive, negative, and positive refractive powers for zooming or otherwise positive, negative, negative, positive, positive refractive powers for the same purpose where the third foremost lens group is used for focusing while the fifth lens group is dedicated to anti-vibration operation; and its variable magnification power is super-enhanced to such an extent of being as high as approximately 12× without compromising a capability of inner-focusing to photograph a proximal object (e.g., see Patent Document 2).

Still another prior art enhanced variable power zoom lens is the one that is as high as 10× in zoom ratio and that has lens groups respectively of positive, negative, positive, negative, and positive refractive powers for zooming; that is, the lens groups consists of at least the 1st lens group G1 of positive refractivity, the 2nd lens group G2 of negative refractivity, the 3rd lens group G3 of positive refractivity, the 4th lens group G4 of negative refractivity, and the 5th lens group G5 of positive refractivity arranged in order from a position closer to the object where as the photographing mode is shifted from the wide-angle to the telephoto to vary the magnification power, the 1st lens group G1 and the 2nd lens group G2 spread farther apart from each other, the 2nd lens group G2 and the 3rd lens group G3 come closer to each other, the 3rd lens group G3 and the 4th lens group G3 also spread farther apart from each other, and the 4th lens group G4 and the 5th lens group G5 come closer to each other (e.g., see Patent Document 3).

Further another prior art enhanced variable power zoom lens is the one that consists of four lens groups, namely, the 1st lens group to the 4th lens group respectively having positive, negative, positive, and positive refractive powers in sequence from a position closer to the object; and the 1st and 2nd lens groups separate farther away from each other so as to vary the magnification power from the wide-angle to the telephoto while concurrently the 3rd lens group axially moves to compensate for variation in the image plane in association with varying the magnification power, and the 2nd lens group moves orthogonal to the optical axis and simultaneously makes a minute turn about a single point on the optical axis within or near the 2nd lens group to compensate for a blur of the image; i.e., provided is a method in which the primary power-varying lens group in the positive lead type zoom lens, namely, the 2nd lens group of negative refractivity serves as an anti-vibration lens and moves orthogonal to the optical axis (e.g., see Patent Document 4).

Yet another prior art enhanced variable power zoom lens is the one with the 2nd lens group comprising lens subsets one of which, namely, a non-focusing lens subset 2a serves as an anti-vibration lens; and this zoom lens is compact since displacement of its focusing lens group is not extremely increased during focusing (e.g., see Patent Document 5). The enhanced variable power zoom lens has the 1st lens group of positive refractivity, the 2nd lens group of negative refractivity, and one or more succeeding lens groups of positive refractivity as a whole arranged in sequence from a position closer to one conjugate point as the origin of a longer half of a conjugate distance upon varying the magnification power from the wide-angle to the telephoto, the 1st and 2nd lens groups separate farther apart from each other while the 2nd lens group and the succeeding lens group(s) come closer to each other; and the 2nd lens group comprises lens subsets, namely, the lens subset 2a of negative refractivity and another lens subset 2b of negative refractivity closer to the other conjugate point as the terminal point of a shorter half of the conjugate distance than the lens subset 2a so that the lens subset 2b is dedicated to focusing under specific relative conditions among the focal length at the wide-angle end, the focal length at the telephoto end, and the focal length of the lens subset 2a.

Furthermore, there is another prior art enhanced variable power zoom lens of the reduced variation in image magnification ratio for focusing, which has the 1st lens group of positive refractive power, the 2nd lens group of negative refractive power, and the succeeding two or more lens groups arranged in sequence from a position closer to the object where all the lens groups axially move during zooming so as to vary a distance between any pair of the adjacent lens groups while the second rearmost lens group closer to the image plane axially move for focusing (e.g., see Embodiment 7 in Patent Document 6 listed below). This enhanced variable power zoom lens has the downsized focusing and anti-vibration lens groups although it still attains an enhanced zoom ratio as high as lox.

LIST OF CITED DOCUMENTS OF THE RELATED ART

Patent Document 1—Preliminary Publication of Unexamined Patent Application No. 2005-331697;
Patent Document 2—Preliminary Publication of Unexamined Patent Application No. 2003-329933;
Patent Document 3—Preliminary Publication of Unexamined Patent Application No. H10-0133109;
Patent Document 4—Preliminary Publication of Unexamined Patent Application No. H05-0232410;
Patent Document 5—Preliminary Publication of Unexamined Patent Application No. 2000-028923; and
Patent Document 6—Preliminary Publication of Unexamined Patent Application No. 2009-265652.

In the enhanced variable power zoom lens disclosed in Patent Document 1, since the 2nd lens group serves as a focusing lens and consists of five lens pieces, the focusing lens is heavy and increases in variation of the image magnification ratio, and this is undesirable for the contrast-detect automatic focusing.

In the enhanced variable power zoom lens disclosed in Patent Document 2, the 3rd lens group consisting of two lens pieces serves as a focusing lens and realizes weight reduction of a kind, but the focusing lens of approximately 10 grams is still heavy and insufficient in weight reduction demanded for the focusing lens. In order to further reduce weight, the 5th lens group is dedicated to anti-vibration, and this attempt still fails to attain sufficient weight reduction. The zoom lens configured in this manner is also hard to have the increased optical performance including an ability to compensate for optical aberrations.

In the enhanced variable power zoom lens disclosed in Patent Document 3, the 3rd lens group consisting of three lens pieces serves as a focusing lens, and the focusing lens is 10 grams or even heavier, which is unsatisfactory in an application directed to contract-detect automatic focusing. It is also unacceptable as a compact and enhanced variable power zoom lens.

In the enhanced variable power zoom lens disclosed in Patent Document 4, the 2nd lens group of negative refractive power is suitable for serving as an anti-vibration lens because of the reduced development of comatic aberration upon moving eccentrically. However, the 2nd lens group in the enhanced variable power zoom lens essentially consists of four or more lens pieces, and thus, the zoom lens is disadvantageous in that it is hard to downsize the anti-vibration mechanism.

In the enhanced variable power zoom lens disclosed in Patent Document 5, the lens subset 2a must have the increased lens diameter to obtain a sufficient quantity of light around the image plane at the wide-angle end, and thus, the zoom lens is disadvantageous in that it is hard to downsize the anti-vibration mechanism.

In the enhanced variable power zoom lens (Embodiment 7) disclosed in Patent Document 6, the 3rd lens group of negative refractivity consisting of two lens pieces serves as an anti-vibration lens, and the anti-vibration lens is reduced in weight. However, since the lens group closer to the object than the aperture stop is used to correct a blur of the image due to a shake of photographer's hands and thus of the camera, it encounters a difficulty in inhibiting varied astigmatism during stabilizing the image against the camera shake, and thus, the optical performance of the zoom lens during image stabilizing operation is unsatisfactory. In addition, since the zoom lens has a filter of a large diameter and has six lens groups respectively of positive, negative, negative, positive, negative, and negative refractive powers for zooming, the zoom lens is disadvantageous in that it is hard to provide a compact lens barrel.

The present invention is made to overcome the aforementioned disadvantages in the prior art enhanced variable power zoom lens, and accordingly, it is an object of the present invention to provide the improved enhanced variable power zoom lens that is lightweight as a whole, and especially, has its focusing lens optics reduced in weight so as to relieve of a load on a focusing drive system, and that has its anti-vibration lens optics reduced in both diameter and weight so as to relieve of a load on an anti-vibration drive system and downsize the same.

It is another object of the present invention to provide the improved enhanced variable power zoom lens that is upgraded in optical capability of compensating for aberrations and in performance as represented by the reduced variation in image magnification ratio during focusing as well as facile handling and manipulation.

SUMMARY OF THE INVENTION

The present invention provides an enhanced variable power zoom lens that is adapted to have the foremost or first lens group G1 of positive refractivity, the second lens group G2 of negative refractivity, the third lens group G3 of positive refractivity, the fourth lens group G4 of negative refractivity, and the fifth lens group G5 arranged in sequence from a position closer to the object where the fourth lens group G4 is moved toward the image plane for focusing on from the infinity to the proximity object while part of the third lens group G3 is moved in a direction orthogonal to the optical axis for shifting an image.

The enhanced variable power zoom lens according to the present invention is configured as mentioned above so as to reduce weight in whole and in part, especially, having its focusing lens optics lightened to relieve of a load on a focusing drive system and having its anti-vibration lens optics reduced in both diameter and weight to relieve of a load on an anti-vibration drive system, thereby attaining the downsizing of the anti-vibration drive system.

In accordance with the present invention, the enhanced variable power zoom lens is upgraded in optical capability of correcting aberrations and in performance to attain the reduced variation in image magnification ratio during focusing as well as facile handling and manipulation, and is capable of producing a clear image with the reduced effects of the optical aberrations.

Some aspects of the present invention will be outlined.

The enhanced variable power zoom lens generally has the foremost or first lens group G1 of positive refractivity, the second lens group G2 of negative refractivity, the third lens group G3 of positive refractivity, the fourth lens group G4 of negative refractivity, and the fifth lens group G5 arranged in sequence from a position closer to the object. During zooming from the wide-angle to the telephoto, each pair of the adjacent lens groups come apart from or closer to each other, and each lens group move closer to the object at the telephoto than at the wide-angle. Designed to take such optical posture and behavior for zooming, the zoom lens at the wide-angle end can be compact although it still provides an angle of view of 75 degrees or wider and a zoom ratio of 10× or even higher.

The third lens group G3 and the fourth lens group G4 separate the farthest away from each other at the intermediate zooming range. Designed to take such optical posture for zooming, the zoom lens is able to compensate for distortion of the image plane at the intermediate zooming range.

Also, for focusing on from the infinity to a proximal object, the fourth lens group G4 moves toward the image plane. With a design where the fourth lens group G4 of negative refractivity, which is positioned right behind the third lens group G3 of positive refractivity and closer to the image filed, serves as a focusing lens, it is facilitated to reduce an outer lens diameter of the focusing lens.

The third lens group G3 consists the foremost lens subset G3A of lens pieces 3A of positive refractivity, the second foremost lens subset G3B of lens pieces 3B of positive refractivity, and the succeeding lens subset G3C of lens pieces 3C, and the lens subset G3B of the lens pieces 3B is moved orthogonal to the optical axis so as to correct an imaging position against an image blur due to a shake of photographer's hands, and thus, a shake of a camera. With a design where the lens subset G3B positioned right behind the lens subset G3A of positive refractivity serves as an anti-vibration lens, it becomes possible to reduce a diameter of the anti-vibration lens. The lens subset G3B of the lens pieces 3B has a composite lens consisting of positive and negative lens pieces arranged in sequence from a position closer to the object. Configured in this manner, the zoom lens is lightweight and is capable of compensating for chromatic aberration well upon correcting an image blur due to a shake of photographer's hands. One of surfaces positioned the closest to the object, of all the lens pieces in the lens subset G3B is made aspherical in shape. In this way, also, it is possible to compensate for variation in spherical aberration and comatic aberration well upon correcting an image blur due to a shake of photographer's hands.

In another aspect of the present invention, the zoom lens meets requirements as expressed in the following formulae:

$$0.8 < f3B/f3 < 4.0 \quad (1)$$

$$0.1 < f3B/ft < 0.3 \quad (2)$$

where f3B is a focal length of the lens subset G3B of the lens pieces 3B, f3 is the focal length of the third lens group G3, and ft is the focal length of the entire optics at the telephoto end.

The formula (1) provides conditions to prescribe a ratio of the focal length of the lens subset G3B of the lens pieces 3B to that of the third lens group G3, and when f3B/f3 exceeds the upper limit defined in the formula (1), the lens subset G3B of the lens pieces 3B has it positive refractive power diminished, and instead, the lens subset G3B is to move by a greater displacement as required for correcting an image blur due to a shake of photographer's hands. As a consequence, an actuator is unavoidably increased in dimensions, which leads to difficulty in downsizing the zoom lens as a whole. When f3B/f3 is too small to such an extent of exceeding the lower limit as defined in the formula (1), the lens subset G3B of the lens pieces 3B has its positive refractive power raised. Consequently, various types of aberration caused in the lens subset G3B become more conspicuous, and it is hard to compensate for decentration aberration well upon correcting an image blur due to a shake of photographer's hands.

The formula (2) provides conditions to prescribe a ratio of the focal length of the lens subset G3B of the lens pieces 3B to that of the zoom lens at the telephoto end, when f3B/ft exceeds the upper limit defined in the formula (2), the lens subset G3B of the lens pieces 3B has its positive refractive power diminished, and instead, the lens subset G3B is to move by a greater displacement as required for correcting an image blur due to a shake of photographer's hands. As a consequence, an actuator is unavoidably increased in dimensions, which leads to difficulty in downsizing the zoom lens as a whole. When f3B/ft is too small to such an extent of exceeding the lower limit as defined in the formula (2), the lens subset G3B of the lens pieces 3B has its positive refractive power raised. Consequently, various types of aberration caused in the lens subset G3B become more conspicuous, and it is hard to compensate for decentration aberration well upon correcting an image blur due to a shake of photographer's hands.

BRIEF DESCRIPTION OF THE DRAWINGS

FIG. 2a illustrates graphs of various types of aberration when the zoom lens of the first embodiment at the wide-angle end for zooming is in infinity focus.

FIG. 3a illustrates graphs of the various types of aberration when the zoom lens of the first embodiment at the intermediate range for zooming is in infinity focus.

FIG. 4b illustrates graphs of the various types of aberration when the zoom lens of the first embodiment at the telephoto end for zooming is in proximity focus.

FIG. 5 is a cross-sectional view showing a second embodiment of the zoom lens according to the present invention.

FIG. 6a illustrates graphs of various types of aberration when the zoom lens of the second embodiment at the wide-angle end for zooming is in infinity focus.

FIG. 6b illustrates graphs of the various types of aberration when the zoom lens of the second embodiment at the wide-angle end for zooming is in proximity focus.

FIG. 7a illustrates graphs of the various types of aberration when the zoom lens of the second embodiment at the intermediate range for zooming is in infinity focus.

FIG. 7b illustrates graphs of the various types of aberration when the zoom lens of the second embodiment at the intermediate range for zooming is in proximity focus.

FIG. 8a illustrates graphs of the various types of aberration when the zoom lens of the second embodiment at the telephoto end for zooming is in infinity focus.

FIG. 8b illustrates graphs of the various types of aberration when the zoom lens of the second embodiment at the telephoto end for zooming is in proximity focus.

FIG. 10a illustrates graphs of various types of aberration when the zoom lens of the third embodiment at the wide-angle end for zooming is in infinity focus.

FIG. 10b illustrates graphs of the various types of aberration when the zoom lens of the third embodiment at the wide-angle end for zooming is in proximity focus.

FIG. 11a illustrates graphs of the various types of aberration when the zoom lens of the third embodiment at the intermediate range for zooming is in infinity focus.

FIG. 11b illustrates graphs of the various types of aberration when the zoom lens of the third embodiment at the intermediate range for zooming is in proximity focus.

FIG. 12a illustrates graphs of the various types of aberration when the zoom lens of the third embodiment at the telephoto end for zooming is in infinity focus.

FIG. 12b illustrates graphs of the various types of aberration when the zoom lens of the third embodiment at the telephoto end for zooming is in proximity focus.

FIG. 14a illustrates graphs of various types of aberration when the zoom lens of the fourth embodiment at the wide-angle end for zooming is in infinity focus.

FIG. 14b illustrates graphs of the various types of aberration when the zoom lens of the fourth embodiment at the wide-angle end for zooming is in proximity focus.

FIG. 15a illustrates graphs of the various types of aberration when the zoom lens of the fourth embodiment at the intermediate range for zooming is in infinity focus.

FIG. 15b illustrates graphs of the various types of aberration when the zoom lens of the fourth embodiment at the intermediate range for zooming is in proximity focus.

FIG. 16a illustrates graphs of the various types of aberration when the zoom lens of the fourth embodiment at the telephoto end for zooming is in infinity focus.

FIG. 16b illustrates graphs of the various types of aberration when the zoom lens of the fourth embodiment at the telephoto end for zooming is in proximity focus.

BEST MODE OF THE INVENTION

Figure 1:
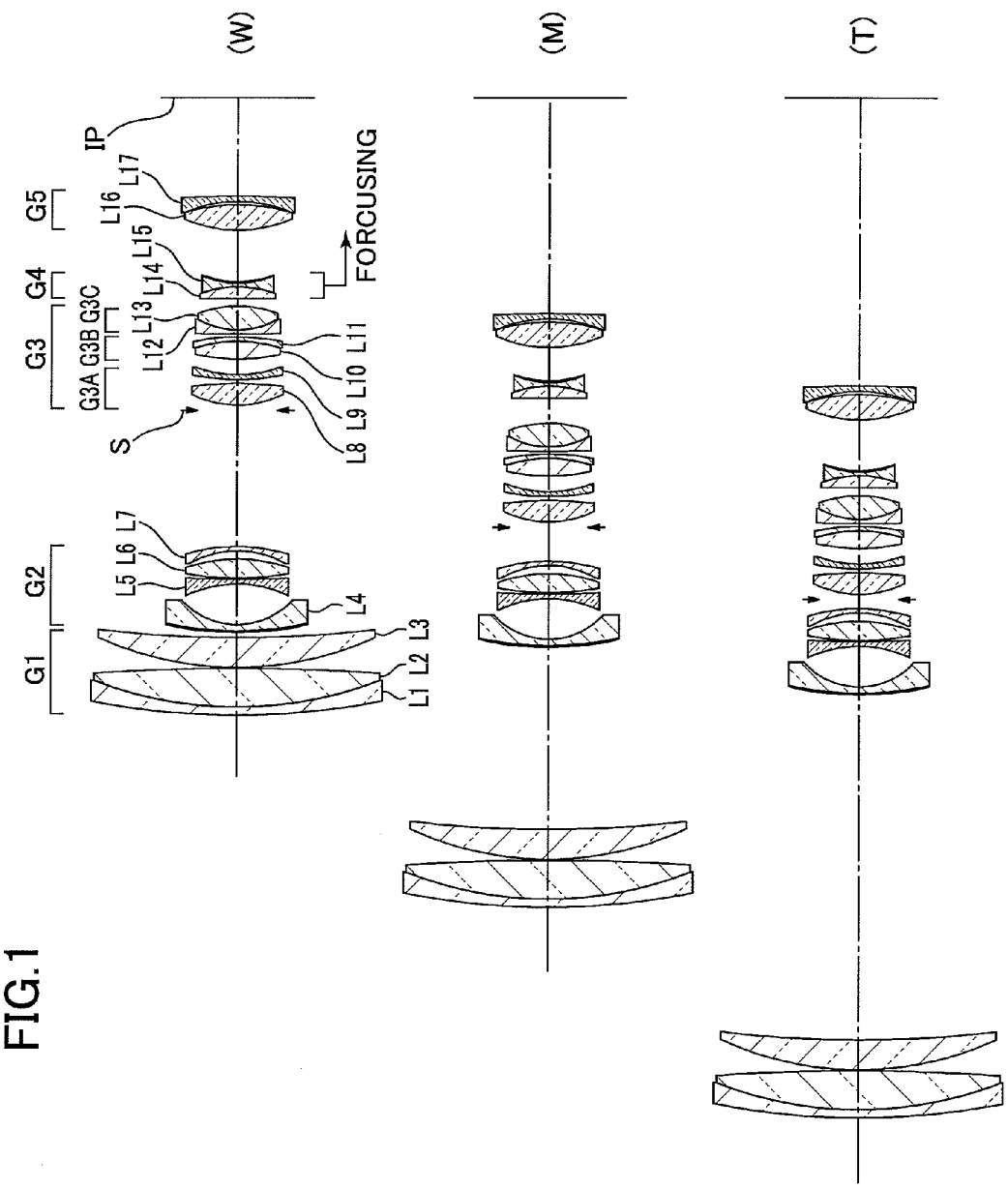
FIG. 1 is a cross-sectional view showing a first embodiment of a zoom lens according to the present invention.
Figure 2B:
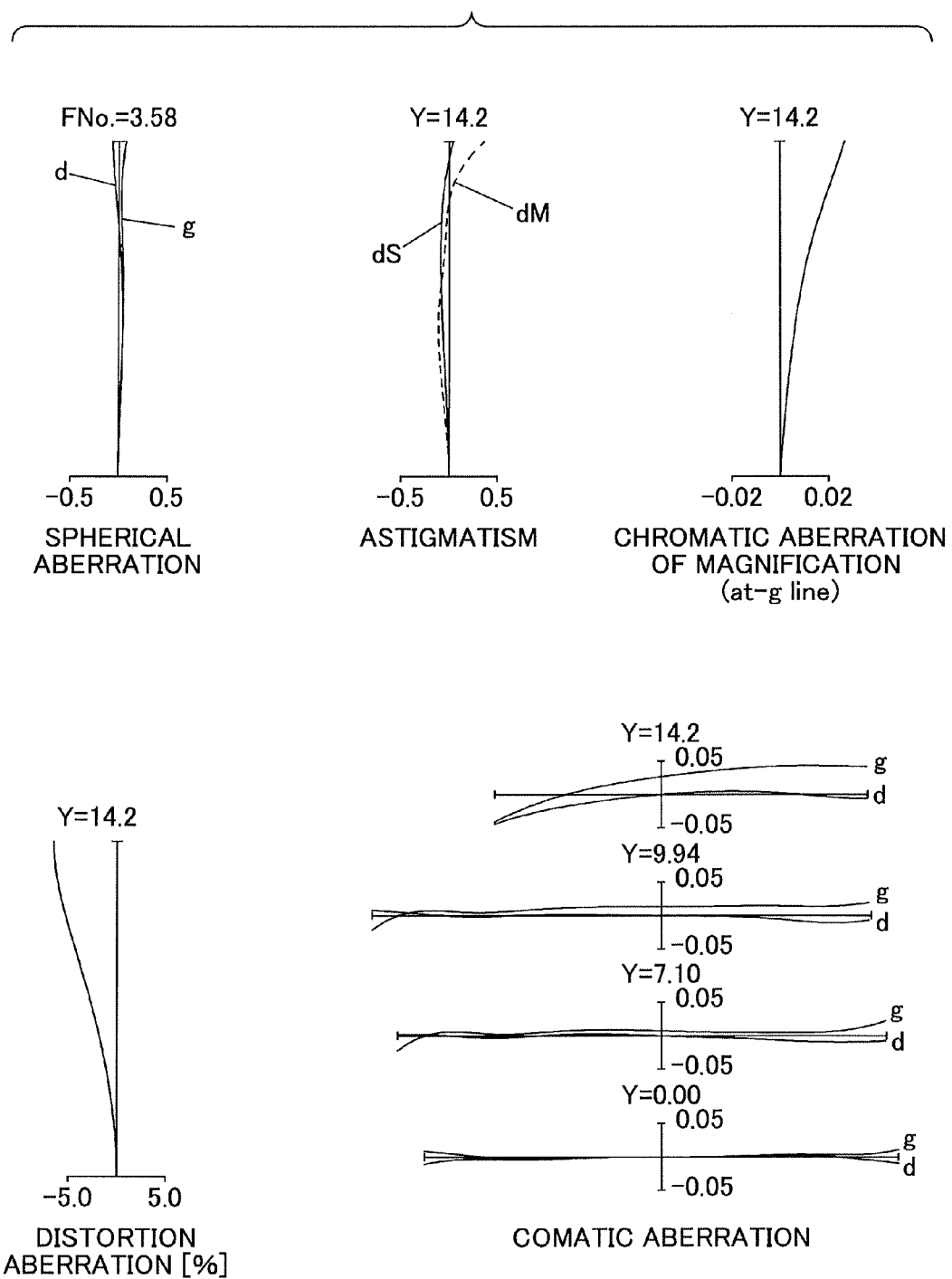
FIG. 2b illustrates graphs of the various types of aberration when the zoom lens of the first embodiment at the wide-angle end for zooming is in proximity focus.
Figure 3B:
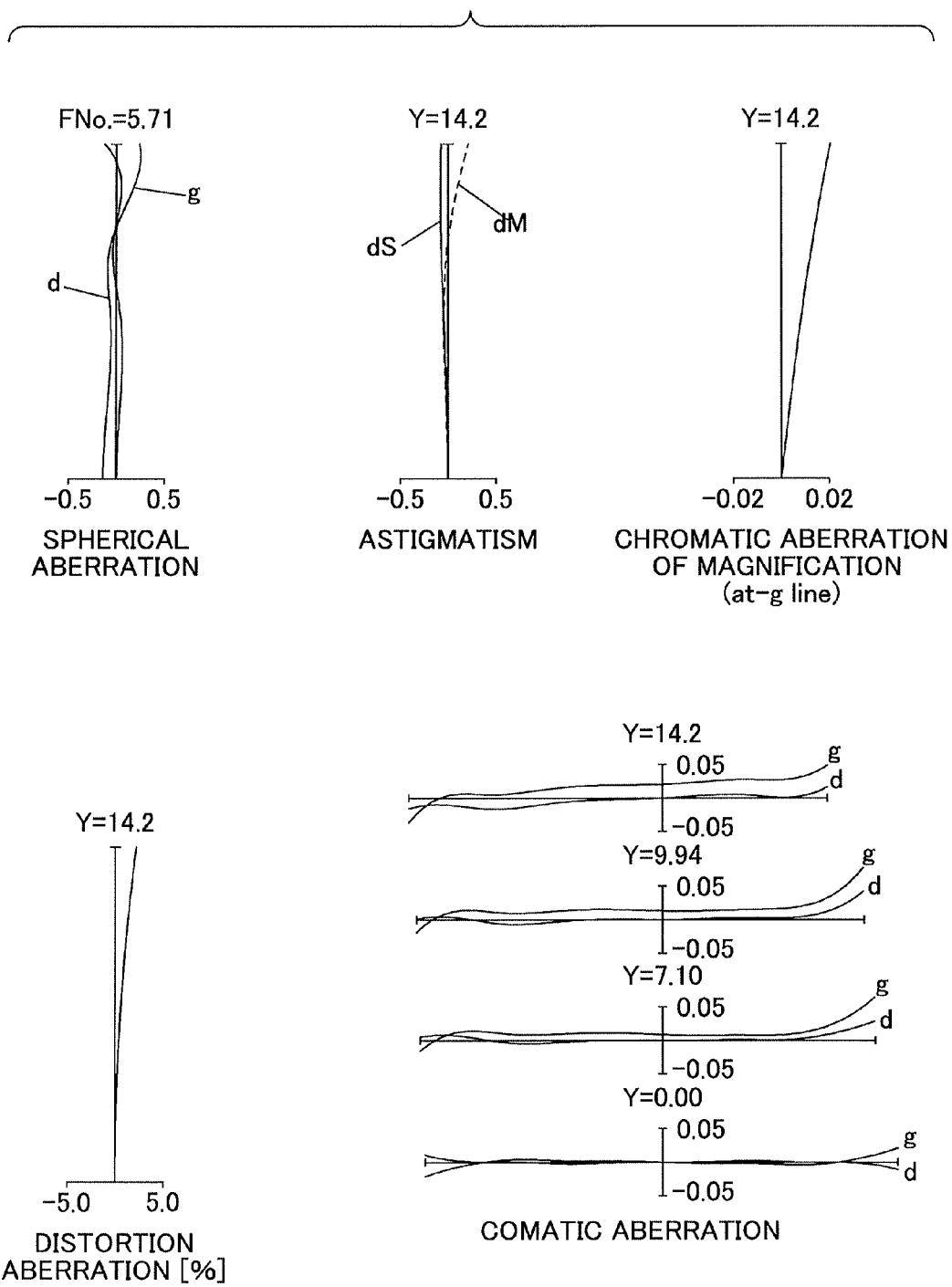
FIG. 3b illustrates graphs of the various types of aberration when the zoom lens of the first embodiment at the intermediate range for zooming is in proximity focus.
Figure 4A:
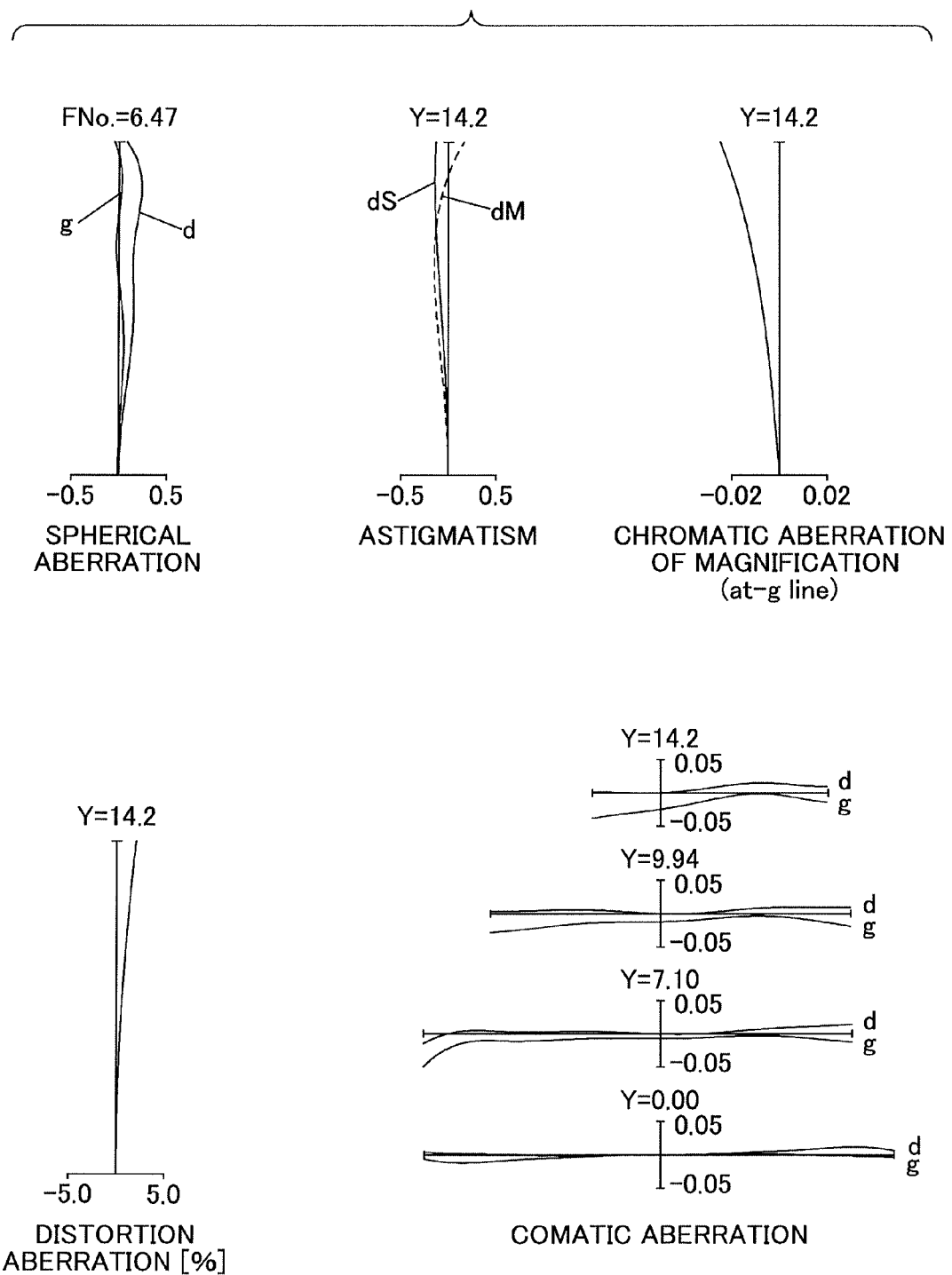
FIG. 4a illustrates graphs of the various types of aberration when the zoom lens of the first embodiment at the telephoto end for zooming is in infinity focus.
Figure 9:
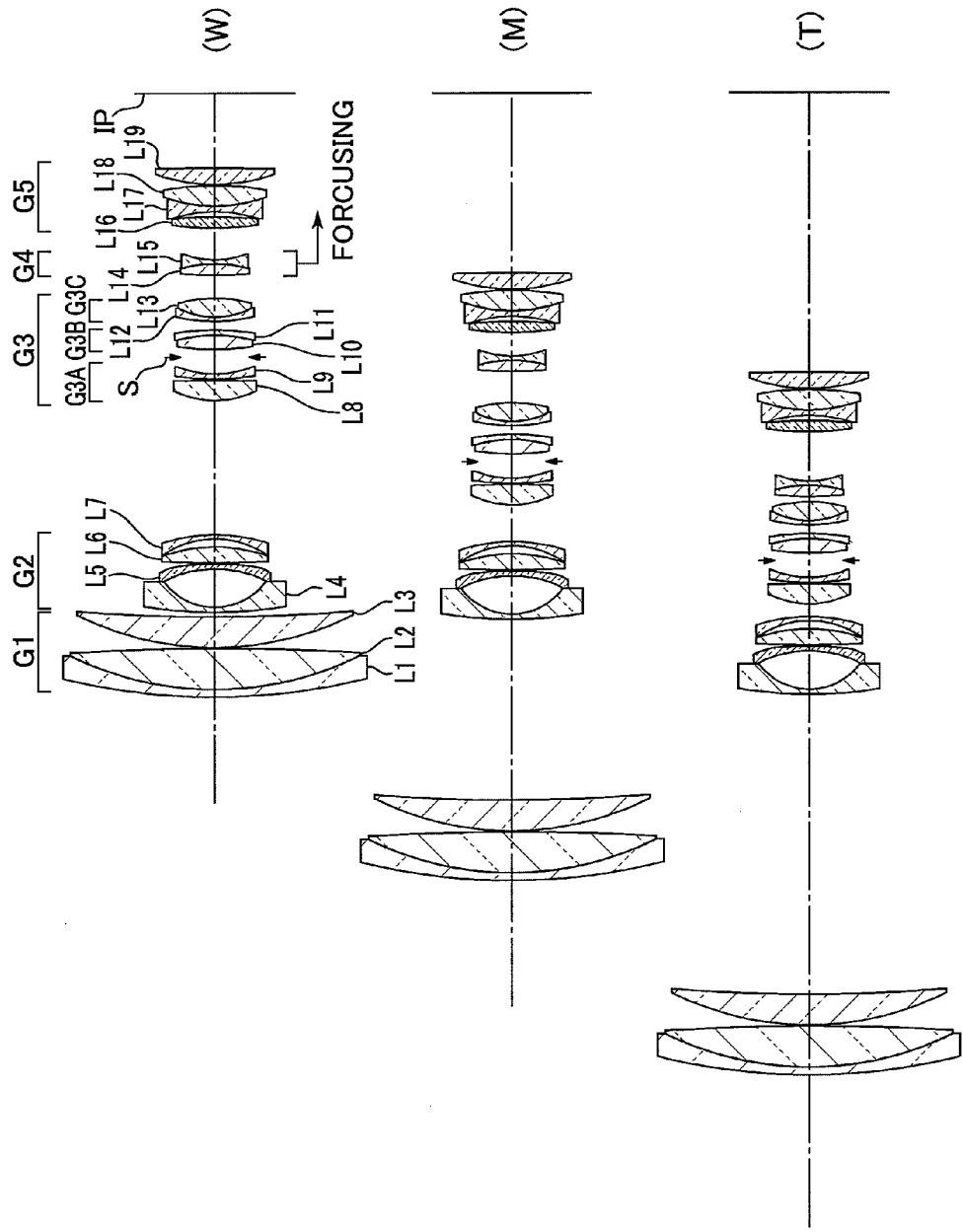
FIG. 9 is a cross-sectional view showing a third embodiment of the zoom lens according to the present invention.
Figure 13:
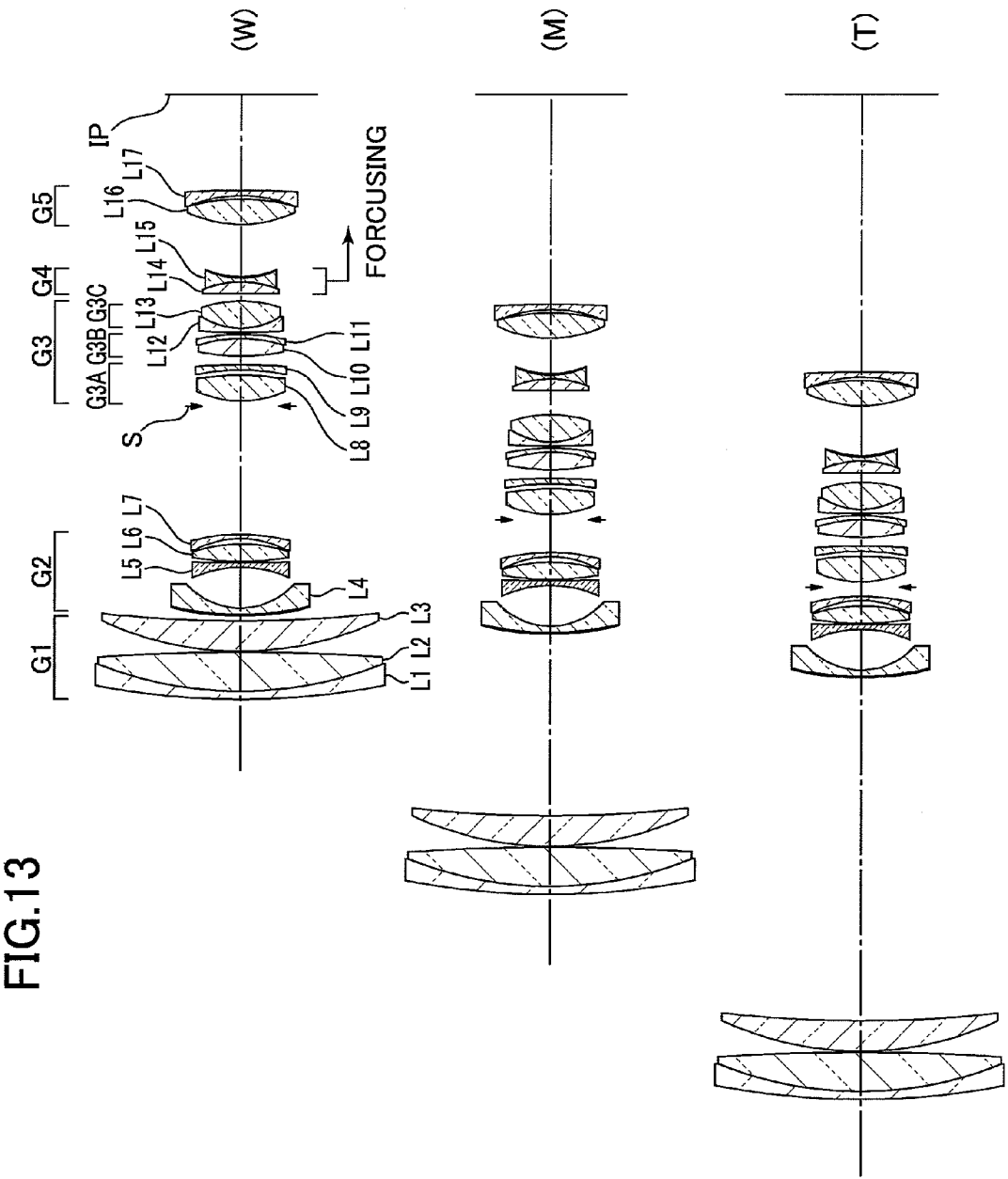
FIG. 13 is a cross-sectional view showing a fourth embodiment of the zoom lens according to the present invention.

The present invention will now be described in conjunction with embodiments, referring to the accompanying drawings.

In discussing each embodiment, the term 'aspherical surface or aspheric' means a surface or state as expressed by the following formula:

$$x = \frac{H^2/r}{1+\sqrt{1-(1+k)(H/r)^2}} + A_4 H^4 + A_6 H^6 + A_8 H^8 + A_{10} H^{10} \quad (3)$$

where x is the optical axis, H is a height from the optical axis in a direction orthogonal to the optical axis, r is a paraxial radius of curvature, k is a coefficient of the cone, and An is a factor of the aspherical surface raised to the n-th power.

Embodiment 1

A first embodiment of an enhanced variable power zoom lens consists of the foremost or first lens group G1 of positive refractivity, the second lens group G2 of negative refractivity, the third lens group G3 of positive refractivity, the fourth lens group G4 of negative refractivity, and the fifth lens group G5 of positive refractivity arranged in sequence from a position closer to the object.

The first lens group G1 consists of a composite lens of a negative meniscus lens piece L1 having its convex surface directed toward the object and a double-convex lens piece L2, and a positive meniscus lens L3 having its convex surface directed toward the object.

The second lens group G2 consists of a negative meniscus lens L4 having its convex surface directed toward the object, a double-concave lens L5, a double-convex lens L6, and a negative meniscus lens L7 having its convex surface directed toward the image plane. The negative meniscus lens L4 positioned the closest to the object of all the lens pieces in the second lens group G2 is a composite aspherical lens having its glass surface closer to the object superposed with resin layer and shaped in aspherical surface.

An aperture stop is positioned right ahead of the foremost lens piece in the third lens group G3. A design with the aperture stop positioned closer to the object than the third lens group G3 facilitates reduction in diameter of the upfront lens of the zoom lens.

The third lens group G3 consists of a double-convex lens L8, a negative meniscus lens L9 having its convex surface directed toward the object, a composite lens consisting of a double-convex lens piece L10 and a negative meniscus lens piece L11 having its convex surface directed toward the image plane, and a composite lens consisting of a negative meniscus lens piece L12 having its convex surface directed toward the object and a double-convex lens piece L13 arranged in sequence from a position closer to the object. The double-convex lens L8, positioned the closest to the object, of all the lens pieces in the third lens group G3 is a glass molded aspherical lens that has both the front and rear major surfaces made aspherical in shape.

The double-convex lens piece L10 is a glass molded aspherical lens that has its front major surface made aspheric in shape. Correcting an image blur due to a shake of photographer's hands is conducted by moving the composite lens of the double-convex lens piece L10 and the negative meniscus lens piece L11 in a direction orthogonal to the optical axis.

The fourth lens group G4 consists of a positive meniscus lens L14 having its convex surface directed toward the image plane and a double-concave lens L15 arranged in sequence from a position closer to the object. The double-concave lens L15, positioned the closest to the image plane, of all the lens pieces in the fourth lens group G4 is a composite aspherical lens that has its rear surface made aspherical in shape.

The fifth lens group G5 consists of a double-convex lens L16 closer to the object and a negative meniscus lens L17 having its convex surface directed toward the image plane.

The zoom lens of the first embodiment is implemented under conditions as expressed by the numerical data as follows:

f=18.4671 to 193.7966

F No.=3.58 to 6.47

2ω=78.47 to 8.20

The zoom lens of the first embodiment is represented by the factors, namely, radius of curvature r, thickness (distance between lens surfaces) d, refractive indices, nd and vd, as given as follows (any surface number with a suffix of an asterisk (*) is for an aspherical surface):

| Surface Number | r | d | nd | vd |
|---|---|---|---|---|
| Object Plane | ∞ | (d0) | | |
| 1 | 140.6286 | 1.5000 | 1.90366 | 31.31 |
| 2 | 72.7778 | 7.2029 | 1.49700 | 81.61 |
| 3 | −395.7178 | 0.2000 | | |
| 4 | 61.5306 | 5.5571 | 1.61800 | 63.39 |
| 5 | 221.7716 | (d5) | | |
| 6* | 90.6266 | 0.2000 | 1.51460 | 49.96 |
| 7 | 60.6266 | 1.2000 | 1.90366 | 31.31 |
| 8 | 13.8208 | 7.5749 | | |
| 9 | −21.7485 | 0.9000 | 1.83481 | 42.72 |
| 10 | 240.9339 | 0.2000 | | |
| 11 | 52.2290 | 3.5618 | 1.92286 | 20.88 |
| 12 | −28.3941 | 1.5245 | | |
| 13 | −17.8390 | 0.8000 | 1.83481 | 42.72 |
| 14 | −33.0000 | (d14) | | |
| 15 (Aperture Stop) | ∞ | 1.0000 | | |
| 16* | 18.4782 | 4.0353 | 1.61881 | 63.85 |
| 17* | −48.5651 | 0.7167 | | |
| 18 | 41.8835 | 0.9000 | 1.77250 | 49.62 |
| 19 | 22.8773 | 2.9125 | | |
| 20* | 33.2873 | 3.3000 | 1.59201 | 67.02 |
| 21 | −25.5242 | 0.8000 | 1.84666 | 23.78 |
| 22 | −41.3225 | 0.5260 | | |
| 23 | 265.5713 | 0.8000 | 1.90366 | 31.31 |
| 24 | 14.7745 | 4.4219 | 1.51742 | 52.15 |
| 25 | −21.3443 | (d25) | | |
| 26 | −1799.6857 | 2.2000 | 1.72825 | 28.32 |
| 27 | −20.2692 | 0.7000 | 1.69680 | 55.46 |
| 28 | 16.8599 | 0.2500 | 1.51460 | 49.96 |
| 29* | 18.1394 | (d29) | | |
| 30 | 24.6924 | 4.7278 | 1.48749 | 70.44 |
| 31 | −34.7332 | 0.5818 | | |
| 32 | −25.1727 | 1.0000 | 1.83481 | 42.72 |
| 33 | −195.8334 | (BF) | | |

The zoom lens of the first embodiment has the aspheric surfaces each of which is characterized by a coefficient as given below:

| Surface Number | k | A4 | A6 | A8 | A10 |
|---|---|---|---|---|---|
| 6 | 0.0000 | 2.00246E−05 | −4.07575E−08 | 1.35108E−10 | 2.54007E−13 |
| 16 | −1.6765 | 1.73663E−05 | −1.78587E−09 | 1.55565E−09 | 5.28154E−12 |
| 17 | 0.0000 | 4.00586E−05 | −8.57830E−08 | 2.49011E−09 | −1.89872E−13 |
| 20 | 0.0000 | −1.59299E−05 | 4.84995E−08 | −1.30605E−09 | 9.03492E−12 |
| 29 | 0.0000 | −2.10416E−05 | 1.08897E−07 | −6.52540E−09 | 5.29800E−11 |

The zoom lens of the first embodiment, when in infinity focus, has the lens surfaces of the lens pieces variably distanced as follows:

| | Wide-angle End | Intermediate Range | Telephoto End |
|---|---|---|---|
| f | 18.4671 | 69.9995 | 193.7966 |
| d0 | ∞ | ∞ | ∞ |
| d5 | 1.0000 | 34.0712 | 64.3105 |
| d14 | 25.4255 | 6.3450 | 1.7000 |
| d25 | 1.4000 | 4.7187 | 1.4999 |
| d29 | 9.5946 | 6.2759 | 9.4947 |
| BF | 18.3076 | 40.0562 | 53.5093 |

The zoom lens of the first embodiment, when in proximity focus (i.e., upon proximity photographing as close as 0.5 meters to the object), has the lens surfaces of the lens pieces variably distanced as follows:

| | Wide-angle End | Intermediate Range | Telephoto End |
|---|---|---|---|
| f | 18.1576 | 60.2317 | 105.9540 |
| d0 | 384.9800 | 349.2410 | 310.1970 |
| d5 | 1.0000 | 34.0712 | 64.3105 |
| d14 | 25.4255 | 6.3450 | 1.7000 |
| d25 | 1.6487 | 6.5210 | 9.1651 |
| d29 | 9.3459 | 4.4736 | 1.8296 |
| BF | 18.3076 | 40.0562 | 53.5093 |

The zoom lens of the first embodiment is designed to take values for each of the formulae (1) and (2) that have been given above:

$$f3B/f3 = 1.830 \tag{1}$$

$$f3B/ft = 0.185 \tag{2}$$

Embodiment 2

A second embodiment of the enhanced variable power zoom lens according to the present invention consists of the foremost or first lens group G1 of positive refractivity, the second lens group G2 of negative refractivity, the third lens group G3 of positive refractivity, the fourth lens group G4 of negative refractivity, and the fifth lens group G5 of negative refractivity arranged in sequence from a position closer to the object.

The first lens group G1 consists of a composite lens of a negative meniscus lens piece L1 having its convex surface directed toward the object and a double-convex lens piece L2, and a positive meniscus lens L3 having its convex surface directed toward the object.

The second lens group G2 consists of a negative meniscus lens L4 having its convex surface directed toward the object, a double-concave lens L5, a double-convex lens L6, and a negative meniscus lens L7 having its convex surface directed toward the image plane arranged in sequence from a position closer to the object. The negative meniscus lens L4, positioned the closest to the object, of all the lens pieces in the second lens group G2 is a composite aspherical lens having its surface closer to the object made aspherical in shape.

The third lens group G3 consists of a positive meniscus lens L8 having its convex surface directed toward the object, a composite lens consisting of a double-convex lens piece L9 and a negative meniscus lens piece L10 having its convex surface directed toward the image plane, and a composite lens consisting of a negative meniscus lens piece L11 having its convex surface directed toward the object and a double-convex lens piece L12 arranged in sequence from a position closer to the object. The positive meniscus lens L8, positioned the closest to the object, of all the lens pieces in the third lens group G3 is a glass molded aspherical lens that has both the front and rear major surfaces made aspherical in shape. The double-convex lens piece L9 is a glass molded aspherical lens that has its front major surface made aspheric in shape. Correcting an image blur due to a shake of photographer's hands is conducted by moving the composite lens of the double-convex lens piece L9 and the negative meniscus lens piece L10 in a direction orthogonal to the optical axis.

The aperture stop is right behind the positive meniscus lens L8 positioned the closest to the object, of all the lens pieces in the third lens group G3.

The fourth lens group G4 consists of a double-convex lens L13 closer to the object and a double-concave lens L14 positioned behind it. The double-concave lens L14, positioned the closest to the image plane, of all the lens pieces in the fourth lens group G4 is a glass molded aspherical lens that has its rear surface made aspherical in shape.

The fifth lens group G5 consists of a double-convex lens L15, a composite lens consisting of a double-concave lens piece L16 and a double-convex lens piece L17, and a double-convex lens L18 arranged in sequence from a position closer to the object.

The zoom lens of the second embodiment is implemented as expressed by the numerical data as follows:
f=18.4727 to 193.6981
F No.=3.52 to 6.49
2ω=78.56 to 8.16

The zoom lens of the second embodiment is represented by the factors, namely, radius of curvature r, thickness (distance between lens surfaces) d, refractive indices, nd and vd, as given as follows (any surface number with a suffix of an asterisk (*) is for an aspherical surface):

| Surface Number | r | d | nd | vd |
|---|---|---|---|---|
| Object Plane | ∞ | (d0) | | |
| 1 | 130.1822 | 1.5000 | 1.90366 | 31.31 |
| 2 | 70.3192 | 8.0000 | 1.49700 | 81.61 |
| 3 | −618.3880 | 0.2000 | | |
| 4 | 67.1874 | 6.0000 | 1.61800 | 63.39 |
| 5 | 355.9279 | (d5) | | |
| 6* | 78.4467 | 0.2000 | 1.51460 | 49.96 |
| 7 | 51.8370 | 1.2000 | 1.90366 | 31.31 |
| 8 | 14.0622 | 7.7373 | | |
| 9 | −21.1050 | 0.9000 | 1.83400 | 37.34 |
| 10 | 75.2303 | 0.3731 | | |
| 11 | 45.7447 | 3.6000 | 1.92286 | 20.88 |
| 12 | −26.8250 | 1.4978 | | |
| 13 | −17.7689 | 0.8000 | 1.83481 | 42.72 |
| 14 | −32.1245 | (d14) | | |
| 15* | 23.2369 | 2.5000 | 1.61881 | 63.85 |
| 16* | 500.0000 | 2.0000 | | |
| 17 (Aperture Stop) | ∞ | 3.0000 | | |
| 18* | 52.1695 | 3.0000 | 1.61881 | 63.85 |
| 19 | −23.8364 | 1.0000 | 1.80809 | 22.76 |
| 20 | −38.5827 | 2.0746 | | |
| 21 | 44.7975 | 0.8000 | 1.90366 | 31.31 |
| 22 | 13.6368 | 4.5000 | 1.56883 | 56.04 |
| 23 | −33.1024 | (d23) | | |
| 24 | 69.4378 | 2.2000 | 1.80809 | 22.76 |
| 25 | −28.7775 | 0.8000 | 1.82080 | 42.71 |
| 26* | 18.2404 | (d26) | | |
| 27 | 124.7143 | 2.4000 | 1.49700 | 81.61 |
| 28 | −29.7638 | 1.1000 | | |
| 29 | −22.8912 | 1.0000 | 1.83481 | 42.72 |
| 30 | 19.4397 | 3.8000 | 1.51680 | 64.20 |
| 31 | −121.9600 | 0.2000 | | |
| 32 | 28.8664 | 3.7000 | 1.60562 | 43.71 |
| 33 | −500.0000 | (BF) | | |

The zoom lens of the second embodiment has the aspheric surfaces each of which is characterized by a coefficient as given below:

| Surface Number | k | A4 | A6 | A8 | A10 |
|---|---|---|---|---|---|
| 6 | 0.0000 | 1.28933E−05 | −1.52071E−08 | −3.90660E−11 | 6.69323E−13 |
| 15 | −0.8659 | 2.48260E−05 | 2.75427E−07 | −3.35843E−09 | 5.70805E−11 |
| 16 | 0.0000 | 4.56781E−05 | 2.93462E−07 | −3.64965E−09 | 6.44333E−11 |
| 18 | 0.0000 | −1.30798E−05 | 3.93669E−09 | 6.54017E−11 | −7.11351E−13 |
| 26 | 0.0000 | −7.16565E−06 | −3.20200E−08 | −1.39534E−09 | 1.50295E−11 |

The zoom lens of the second embodiment, when in infinity focus, has the lens surfaces of the lens pieces variably distanced as follows:

| | Wide-angle End | Intermediate Range | Telephoto End |
|---|---|---|---|
| f | 18.4727 | 69.9995 | 193.6981 |
| d0 | ∞ | ∞ | ∞ |
| d5 | 0.9000 | 36.5480 | 65.6130 |
| d14 | 24.7181 | 7.3691 | 4.0245 |
| d23 | 3.0460 | 5.1714 | 1.0000 |
| d26 | 6.7531 | 4.6278 | 8.7992 |
| BF | 13.6198 | 36.0530 | 49.4455 |

The zoom lens of the second embodiment, when in proximity focus (i.e., upon proximity photographing as close as 0.5 meters to the object), has the lens surfaces of the lens pieces variably distanced as follows:

| | Wide-angle End | Intermediate Range | Telephoto End |
|---|---|---|---|
| f | 18.1240 | 59.9839 | 110.4075 |
| d0 | 384.8810 | 344.4910 | 305.0380 |
| d5 | 0.9000 | 36.5480 | 65.6130 |
| d14 | 24.7181 | 7.3691 | 4.0245 |
| d23 | 3.3285 | 6.9987 | 7.6876 |
| d26 | 6.4706 | 2.8005 | 2.1116 |
| BF | 13.6198 | 36.0530 | 49.4455 |

The zoom lens of the second embodiment is designed to take values for each of the formulae (1) and (2) that have been given above:

$$f3B/f3 = 2.096 \quad (1)$$

$$f3B/ft = 0.210 \quad (2)$$

Embodiment 3

A third embodiment of the enhanced variable power zoom lens according to the present invention consists of the foremost or first lens group G1 of positive refractivity, the second lens group G2 of negative refractivity, the third lens group G3 of positive refractivity, the fourth lens group G4 of negative refractivity, and the fifth lens group G5 of positive refractivity arranged in sequence from a position closer to the object.

The first lens group G1 consists of a composite lens of a negative meniscus lens piece L1 having its convex surface directed toward the object and a double-convex lens piece L2, and a positive meniscus lens L3 having its convex surface directed toward the object.

The second lens group G2 consists of a negative meniscus lens L4 having its convex surface directed toward the object, a negative meniscus lens L5 having its convex surface directed toward the image plane, a double-convex lens L6, and a negative meniscus lens L7 having its convex surface directed toward the image plane arranged in sequence from a position closer to the object. The negative meniscus lens L5 in the second lens group G2 is a glass molded aspherical lens having its front surface closer to the object and its rear surface closer to the image filed made aspherical in shape.

The third lens group G3 consists of a double-convex lens L8, a negative meniscus lens L9 having its convex surface directed toward the object, a composite lens consisting of a double-convex lens piece L10 and a negative meniscus lens piece L11 having its convex surface directed toward the image plane, and a composite lens consisting of a negative meniscus lens piece L12 having its convex surface directed toward the object and a double-convex lens piece L13 arranged in sequence from a position closer to the object. The positive meniscus lens L8, positioned the closest to the object, of all the lens pieces in the third lens group G3 is a glass molded aspherical lens that has both the front and rear major surfaces made aspherical in shape. Correcting an image blur due to a shake of photographer's hands is conducted by moving the composite lens of the double-convex lens piece L10 and the negative meniscus lens piece L11 in a direction orthogonal to the optical axis.

The aperture stop is right behind the negative meniscus lens L9 and closer to the image plane.

The fourth lens group G4 has a composite lens consisting of a double-convex lens piece L14 closer to the object and a double-concave lens piece L15 positioned behind it. The double-concave lens L15, positioned the closest to the image plane, of all the lens pieces in the fourth lens group G4 is a glass molded aspherical lens that has its rear surface made aspherical in shape.

The fifth lens group G5 consists of a double-convex lens L16, a composite lens consisting of a double-concave lens piece L17 and a double-convex lens piece L18, and a double-convex lens L19 arranged in sequence from a position closer to the object.

The zoom lens of the third embodiment is implemented as expressed by the numerical data as follows:

f=18.4635 to 193.6592

F No.=3.62 to 6.52

2ω=78.51 to 8.25

The zoom lens of the third embodiment is represented by the factors, namely, radius of curvature r, thickness (distance between lens surfaces) d, refractive indices, nd and vd, as given as follows (any surface number with a suffix of an asterisk (*) is for an aspherical surface):

| Surface Number | r | d | nd | vd |
|---|---|---|---|---|
| Object Plane | ∞ | (d0) | | |
| 1 | 122.8583 | 1.5000 | 1.90366 | 31.31 |
| 2 | 63.6327 | 8.0000 | 1.49700 | 81.61 |
| 3 | −479.7631 | 0.2000 | | |
| 4 | 60.0702 | 6.0000 | 1.61800 | 63.39 |
| 5 | 326.6006 | (d5) | | |
| 6 | 83.7787 | 1.0000 | 1.80420 | 46.50 |
| 7 | 12.3144 | 7.4805 | | |
| 8* | −22.1241 | 1.0000 | 1.73077 | 40.50 |
| 9* | −64.4650 | 0.2000 | | |
| 10 | 215.4697 | 3.1478 | 1.92286 | 20.88 |
| 11 | −30.2010 | 1.5773 | | |
| 12 | −17.6709 | 0.8000 | 1.83481 | 42.72 |
| 13 | −33.1232 | (d13) | | |
| 14* | 17.2167 | 4.0000 | 1.61881 | 63.85 |
| 15* | −125.5742 | 0.2000 | | |
| 16 | 48.4757 | 1.0000 | 1.77250 | 49.62 |
| 17 | 19.0841 | 3.3000 | | |
| 18 (Aperture Stop) | ∞ | 1.5000 | | |
| 19* | 45.5870 | 2.8000 | 1.61881 | 63.85 |
| 20 | −27.0285 | 1.0000 | 1.80518 | 25.46 |
| 21 | −49.9440 | 1.7247 | | |
| 22 | 32.4233 | 0.8000 | 1.90366 | 31.31 |
| 23 | 15.2360 | 3.6847 | 1.51680 | 64.20 |
| 24 | −27.5987 | (d24) | | |
| 25 | 81.6411 | 2.2000 | 1.80809 | 22.76 |
| 26 | −24.5463 | 0.8000 | 1.82080 | 42.71 |
| 27* | 17.6072 | (d27) | | |
| 28 | 57.2163 | 2.1666 | 1.48749 | 70.44 |
| 29 | −86.5299 | 1.0000 | | |
| 30 | −27.0636 | 1.1000 | 1.80610 | 33.27 |
| 31 | 29.0154 | 4.0000 | 1.51742 | 52.15 |
| 32 | −58.1335 | 0.2000 | | |
| 33 | 34.7156 | 3.1887 | 1.62004 | 36.30 |
| 34 | −500.0000 | (BF) | | |

The zoom lens of the third embodiment has the aspheric surfaces each of which is characterized by a coefficient as given below:

| Surface Number | k | A4 | A6 | A8 | A10 |
|---|---|---|---|---|---|
| 8 | 0.0000 | 7.25755E−05 | −1.27843E−06 | 7.32783E−09 | −2.81756E−11 |
| 9 | 0.0000 | 3.49690E−05 | −1.24580E−06 | 6.63675E−09 | −2.34217E−11 |
| 14 | −1.5994 | 2.13130E−05 | 4.89855E−08 | −2.49609E−10 | −2.54671E−12 |
| 15 | 0.0000 | 2.60502E−05 | −1.46189E−08 | 3.24684E−10 | −8.07360E−12 |
| 19 | 0.0000 | −9.20242E−06 | 8.57474E−09 | −1.54371E−10 | 1.03899E−12 |
| 27 | 0.0000 | −9.97587E−06 | −4.27259E−08 | −8.86898E−10 | 1.03922E−11 |

The zoom lens of the third embodiment, when in infinity focus, has the lens surfaces of the lens pieces variably distanced as follows:

| | Wide-angle End | Intermediate Range | Telephoto End |
|---|---|---|---|
| f | 18.4635 | 69.9769 | 193.6592 |
| d0 | ∞ | ∞ | ∞ |
| d5 | 0.9000 | 35.4429 | 58.6609 |
| d13 | 26.2891 | 7.2099 | 2.5000 |

-continued

|     | Wide-angle End | Intermediate Range | Telephoto End |
|-----|----------------|--------------------|-----------------|
| d24 | 4.5393         | 6.1188             | 1.0612          |
| d27 | 6.2013         | 4.6218             | 9.6795          |
| BF  | 14.5543        | 35.0496            | 54.5230         |

The zoom lens of the third embodiment, when in proximity focus (i.e., upon proximity photographing as close as 0.5 meters to the object), has the lens surfaces of the lens pieces variably distanced as follows:

|     | Wide-angle End | Intermediate Range | Telephoto |
|-----|----------------|--------------------|-----------|
| f   | 18.1515        | 60.5992            | 113.6489  |
| d0  | 381.9470       | 345.9890           | 308.0110  |
| d5  | 0.9000         | 35.4429            | 58.6609   |
| d13 | 26.2891        | 7.2099             | 2.5000    |
| d24 | 4.8281         | 8.1797             | 8.4976    |
| d27 | 5.9125         | 2.5609             | 2.2431    |
| BF  | 14.5543        | 35.0496            | 54.5230   |

The zoom lens of the third embodiment is designed to take values for each of the formulae (1) and (2) that have been given above:

$$f3B/f3=2.163 \quad (1)$$

$$f3B/ft=0.229 \quad (2)$$

Embodiment 4

A fourth embodiment of the enhanced variable power zoom lens according to the present invention consists of the foremost or first lens group G1 of positive refractivity, the second lens group G2 of negative refractivity, the third lens group G3 of positive refractivity, the fourth lens group G4 of negative refractivity, and the fifth lens group G5 of positive refractivity arranged in sequence from a position closer to the object.

The first lens group G1 consists of a composite lens of a negative meniscus lens piece L1 having its convex surface directed toward the object and a double-convex lens piece L2, and a positive meniscus lens L3 having its convex surface directed toward the object.

The second lens group G2 consists of a negative meniscus lens L4 having its convex surface directed toward the object, a double-concave lens L5, a double-convex lens L6, and a negative meniscus lens L7 having its convex surface directed toward the image plane arranged in sequence from a position closer to the object. The negative meniscus lens L4 positioned the closest to the object, of all the lens pieces in the second lens group G2 is a composite aspherical lens having its front surface closer to the object made aspherical in shape.

An aperture stop is right ahead of the third lens group G3 and closer to the object than the same. A design with the aperture stop in a position closer to the object than the third lens group G3 facilitates reduction in a diameter of the upfront lens of the zoom lens.

The third lens group G3 consists of a double-convex lens L8, a negative meniscus lens L9 having its convex surface directed toward the object, a composite lens consisting of a double-convex lens piece L10 and a negative meniscus lens piece L11 having its convex surface directed toward the image plane, and a composite lens consisting of a negative meniscus lens piece L12 having its convex surface directed toward the object and a double-convex lens piece L13 arranged in sequence from a position closer to the object.

The double-convex lens L8, positioned the closest to the object, of all the lens pieces in the third lens group G3 is a glass molded aspherical lens that has both its front major surface closer to the object and its rear major surface closer to the image plane made aspherical in shape. The double-convex lens L10 is a glass molded aspherical lens that has its front surface made aspherical in shape. Correcting an image blur due to a shake of photographer's hands is conducted by moving the composite lens of the double-convex lens piece L10 and the negative meniscus lens piece L11 in a direction orthogonal to the optical axis.

The fourth lens group G4 consists of a positive meniscus lens L14 closer to the object and having its convex surface directed toward the image plane and a double-concave lens piece L15 positioned behind it. The double-concave lens L15, positioned the closest to the image plane, of all the lens pieces in the fourth lens group G4 is a composite aspherical lens that has its rear surface made aspherical in shape.

The fifth lens group G5 consists of a double-convex lens L16 and a negative meniscus lens L17 having its convex surface directed toward the image plane.

The zoom lens of the fourth embodiment is implemented as expressed by the numerical data as follows.

$f$=18.4656 to 193.7618

F No.=3.58 to 6.47

$2\omega$=78.45 to 8.20

The zoom lens of the fourth embodiment is represented by the factors, namely, radius of curvature r, thickness (distance between lens surfaces) d, refractive indices, nd and vd, as given as follows (any surface number with a suffix of an asterisk (*) is for an aspherical surface):

| Surface Number   | r         | d      | nd      | vd    |
|------------------|-----------|--------|---------|-------|
| Object Plane     | ∞         | (d0)   |         |       |
| 1                | 141.2619  | 1.5000 | 1.90366 | 31.31 |
| 2                | 71.0032   | 7.3049 | 1.49700 | 81.61 |
| 3                | −403.3371 | 0.2000 |         |       |
| 4                | 60.9852   | 5.6822 | 1.61800 | 63.39 |
| 5                | 232.8153  | (d5)   |         |       |
| 6*               | 78.7650   | 0.2000 | 1.51460 | 49.96 |
| 7                | 55.0310   | 1.2000 | 1.88300 | 40.80 |
| 8                | 13.4213   | 7.6368 |         |       |
| 9                | −21.7620  | 0.9000 | 1.83400 | 37.34 |
| 10               | 448.6204  | 0.2000 |         |       |
| 11               | 52.5441   | 3.2720 | 1.92286 | 20.88 |
| 12               | −29.2978  | 1.0276 |         |       |
| 13               | −18.4015  | 0.8000 | 1.88300 | 40.80 |
| 14               | −36.5889  | (d14)  |         |       |
| 15 (Aperture Stop) | ∞       | 1.0000 |         |       |
| 16*              | 20.6887   | 4.8000 | 1.61881 | 63.85 |
| 17*              | −40.3367  | 0.9389 |         |       |
| 18               | −42.9919  | 1.0000 | 1.74400 | 44.79 |
| 19               | −120.0000 | 1.6300 |         |       |
| 20*              | 36.9042   | 3.3000 | 1.59201 | 67.02 |
| 21               | −26.0822  | 0.8000 | 1.84666 | 23.78 |
| 22               | −37.7319  | 0.3340 |         |       |
| 23               | 108.8218  | 0.8000 | 1.90366 | 31.31 |
| 24               | 13.3365   | 5.1053 | 1.51742 | 52.15 |
| 25               | −22.9306  | (d25)  |         |       |
| 26               | −8357.4904| 2.2000 | 1.72825 | 28.32 |
| 27               | −18.3036  | 0.7000 | 1.69680 | 55.46 |
| 28               | 15.6342   | 0.2500 | 1.51460 | 49.96 |
| 29*              | 16.7161   | (d29)  |         |       |
| 30               | 23.7440   | 4.7241 | 1.48749 | 70.44 |
| 31               | −37.2401  | 0.6221 |         |       |
| 32               | −25.8488  | 1.0000 | 1.88300 | 40.80 |
| 33               | −185.0333 | (BF)   |         |       |

The zoom lens of the fourth embodiment has the aspheric surfaces each of which is characterized by a coefficient as given below:

| Surface Number | k | A4 | A6 | A8 | A10 |
|---|---|---|---|---|---|
| 6 | 0.0000 | 2.08367E−05 | −4.57755E−08 | 1.75054E−10 | 1.98364E−13 |
| 16 | −1.6344 | 1.80716E−05 | 2.70181E−08 | 1.74662E−09 | −3.38851E−12 |
| 17 | 0.0000 | 4.18327E−05 | −5.69981E−08 | 2.75644E−09 | −9.39699E−12 |
| 20 | 0.0000 | −1.94427E−05 | 5.94040E−08 | −1.82677E−09 | 1.34942E−11 |
| 29 | 0.0000 | −2.42872E−05 | 3.00275E−07 | −1.46151E−08 | 1.38187E−10 |

The zoom lens of the fourth embodiment, when in infinity focus, has the lens surfaces of the lens pieces variably distanced as follows:

|  | Wide-angle End | Intermediate Range | Telephoto End |
|---|---|---|---|
| f | 18.4656 | 69.9889 | 193.7618 |
| d0 | ∞ | ∞ | ∞ |
| d5 | 1.0000 | 34.1618 | 64.2114 |
| d14 | 24.0788 | 6.1436 | 1.7000 |
| d25 | 1.4000 | 4.5190 | 1.8070 |
| d29 | 9.7948 | 6.6758 | 9.3878 |
| BF | 17.9032 | 39.2179 | 51.8628 |

The zoom lens of the fourth embodiment, when in proximity focus (i.e., upon proximity photographing as close as 0.5 meters to the object), has the lens surfaces of the lens pieces variably distanced as follows:

|  | Wide-angle End | Intermediate Range | Telephoto End |
|---|---|---|---|
| f | 18.1467 | 60.0008 | 104.7262 |
| d0 | 386.6960 | 350.1550 | 311.9050 |
| d5 | 1.0000 | 34.1618 | 64.2114 |
| d14 | 24.0788 | 6.1436 | 1.7000 |
| d25 | 1.6235 | 6.1137 | 8.6097 |
| d29 | 9.5713 | 5.0811 | 2.5851 |
| BF | 17.9032 | 39.2179 | 51.8628 |

The zoom lens of the fourth embodiment is designed to take values for each of the formulae (1) and (2) that have been given above:

$$f3B/f3 = 1.900 \qquad (1)$$

$$f3B/ft = 0.183 \qquad (2)$$

The invention claimed is:

1. An enhanced variable power zoom lens having an image plane and an optical axis, the zoom lens operable from a wide-angle position to a telephoto position, the zoom lens comprising:
   a foremost or first lens group of positive refractivity,
   a second lens group of negative refractivity,
   a third lens group of positive refractivity,
   a fourth lens group of negative refractivity, and
   a fifth lens group, the first through fifth lens groups arranged in sequence from a position closer to an object;
   the fourth lens group being moved toward the image plane for focusing on from the infinity to a proximity of the object, and
   part of the third lens group being moved in a direction orthogonal to the optical axis for shifting an image, wherein the zoom lens meets requirements as expressed in the following formulae:

$$0.8 < f3B/f3 < 4.0, \text{ and}$$

$$0.1 < f3B/ft < 0.3$$

where f3B is the focal length of the second foremost lens subset of the third lens group, f3 is the focal length of the third lens group, and ft is the focal length of the entire optics of the first through fifth lens groups at the telephoto position.

2. The enhanced variable power zoom lens according to claim 1, wherein the third lens group includes a foremost lens subset of lens pieces of positive refractivity, a second foremost lens subset of positive refractivity, and a succeeding lens subset arranged in sequence from a position closer to the object, and the second foremost lens subset is moved orthogonal to the optical axis so as to correct an imaging position against an image blur due to a shake of the zoom lens.

3. An enhanced variable power zoom lens having an image plane and an optical axis, the zoom lens operable from a wide-angle position to a telephoto position, the zoom lens comprising:
   a foremost or first lens group of positive refractivity,
   a second lens group of negative refractivity,
   a third lens group of positive refractivity, the third lens group having a plurality of lens subsets,
   a fourth lens group of negative refractivity, and
   a fifth lens group, the first through fifth lens groups arranged in sequence from a position closer to an object;
   the fourth lens group being moved toward the image plane for focusing on from infinity to a proximity of the object, and
   part of the third lens group being moved in a direction orthogonal to the optical axis for shifting an image, the second foremost lens subset includes a composite lens of positive and negative lens pieces, wherein the positive lens piece has a front major surface closer to the object, the major surface being aspherical in shape.

4. The enhanced variable power zoom lens according to claim 3, wherein the plurality of lens subsets includes a first foremost lens subset of lens pieces of positive refractivity, a second foremost lens subset of positive refractivity, and a succeeding lens subset arranged in sequence from a position closer to the object, and the second foremost lens subset is moved orthogonal to the optical axis so as to correct an imaging position against an image blur due to a shake of the zoom lens.

* * * * *